US012039999B2

(12) United States Patent
Zhang

(10) Patent No.: US 12,039,999 B2

(45) Date of Patent: Jul. 16, 2024

(54) METHOD AND APPARATUS FOR DETECTING VALID VOICE SIGNAL AND NON-TRANSITORY COMPUTER READABLE STORAGE MEDIUM

(71) Applicant: Tencent Music Entertainment Technology (Shenzhen) Co., Ltd., Guangdong (CN)

(72) Inventor: Chaopeng Zhang, Guangdong (CN)

(73) Assignee: Tencent Music Entertainment Technology (Shenzhen) Co., Ltd., Guangdong (CN)

( * ) Notice: Subject to any disclaimer, the term of this patent is extended or adjusted under 35 U.S.C. 154(b) by 52 days.

(21) Appl. No.: 17/728,198

(22) Filed: Apr. 25, 2022

(65) Prior Publication Data

US 2022/0246170 A1 Aug. 4, 2022

Related U.S. Application Data

(63) Continuation of application No. PCT/CN2020/128374, filed on Nov. 12, 2020.

(30) Foreign Application Priority Data

Nov. 13, 2019 (CN) ......................... 201911109218.X

(51) Int. Cl.

*G10L 25/78* (2013.01)
*G10L 19/02* (2013.01)

(Continued)

(52) U.S. Cl.

CPC .......... *G10L 25/78* (2013.01); *G10L 19/0216* (2013.01); *G10L 25/21* (2013.01); *G10L 21/0272* (2013.01); *G10L 25/18* (2013.01)

(58) Field of Classification Search

CPC ..... G10L 21/0272; G10L 21/02; G10L 25/78; G10L 25/87; G10L 25/18; G10L 25/84; G10L 25/21; G10L 19/0216

See application file for complete search history.

(56) References Cited

U.S. PATENT DOCUMENTS 5,267,322 A * 11/1993 Smith ................. H03G 3/3026 375/345
6,182,035 B1 * 1/2001 Mekuria ................ G10L 25/78 704/240

(Continued)

FOREIGN PATENT DOCUMENTS

CN 102419972 A 4/2012
CN 103117066 A 5/2013

(Continued)

OTHER PUBLICATIONS

CNIPA, International Search Report for International Patent Application No. PCT/CN2020/128374, 8 pages, Jan. 27, 2021.

(Continued)

*Primary Examiner* — Vijay B Chawan
(74) *Attorney, Agent, or Firm* — IP Spring

(57) ABSTRACT

A method and apparatus for detecting a valid voice signal and a non-transitory computer readable storage medium are provided. A first audio signal including at least one audio frame signal is obtained. Multiple wavelet decomposition signals respectively corresponding to the at least one audio frame signal are obtained. A wavelet signal sequence is obtained by combining the multiple wavelet decomposition signals. A maximum value and a minimum value among audio intensity values of all sample points are obtained, and a first audio intensity threshold is determined according to the maximum value and the minimum value. Sample points each having an audio intensity value greater than the first audio intensity threshold in the wavelet signal sequence are (Continued)

obtained, and a signal of sample points in the first audio signal corresponding to the sample points each having an audio intensity value greater than the first audio intensity threshold is determined as the valid voice signal.

18 Claims, 13 Drawing Sheets

(51) Int. Cl.

| | |
|---|---|
| ***G10L 25/21*** | (2013.01) |
| *G10L 21/0272* | (2013.01) |
| *G10L 25/18* | (2013.01) |

(56) References Cited

U.S. PATENT DOCUMENTS

| | | | | |
|---|---|---|---|---|
| 7,536,301 | B2 * | 5/2009 | Jaklitsch | G10L 25/78 704/226 |
| 10,090,005 | B2 * | 10/2018 | Rumberg | G10L 25/84 |
| 10,304,474 | B2 | 5/2019 | Choo et al. | |
| 11,138,992 | B2 * | 10/2021 | Liu | G10L 25/18 |
| 2004/0064314 | A1 * | 4/2004 | Aubert | G10L 25/87 704/E11.005 |
| 2018/0012614 | A1 * | 1/2018 | Soleymani | G10L 19/0216 |
| 2021/0341989 | A1 * | 11/2021 | Chen | G06F 3/017 |

FOREIGN PATENT DOCUMENTS

| | | | | | |
|---|---|---|---|---|---|
| CN | 103325388 | A | | 9/2013 | |
| CN | 104867493 | A | | 8/2015 | |
| CN | 105374367 | A | | 3/2016 | |
| CN | 106782617 | A | | 5/2017 | |
| CN | 107305774 | A | | 10/2017 | |
| CN | 107564544 | A | | 1/2018 | |
| CN | 108198545 | A | | 6/2018 | |
| CN | 110827852 | A | | 2/2020 | |
| KR | 20060134882 | A | * | 12/2006 | G10L 21/02 |
| KR | 20140031790 | A | * | 3/2014 | G10L 21/0272 |

OTHER PUBLICATIONS

CNIPA, Written Opinion for International Patent Application No. PCT/CN2020/128374, 6 pages, Jan. 27, 2021.

Gangjin, Wang, "The Research of Voice Activity Detection in Low SNR Environments," Master's Dissertation of Hunan University, 210 pages, Jun. 15, 2013.

Borisagar, Komal R et al., "Speech Enhancement in Noisy Environment Using Voice Activity Detection and Wavelet Thresholding," 2010 IEEE International Conference on Computational Intelligence and Computing Research, IEEE, 5 pages, 2010.

CNIPA, First Office Action for Chinese Patent Application No. 201911109218.X, 11 pages, Oct. 11, 2021.

* cited by examiner

METHOD AND APPARATUS FOR DETECTING VALID VOICE SIGNAL AND NON-TRANSITORY COMPUTER READABLE STORAGE MEDIUM

CROSS-REFERENCE TO RELATED APPLICATION(S)

The application is a continuation under 35 U.S.C. § 120 of International Application No. PCT/CN2020/128374, filed on Nov. 12, 2020, which claims priority under 35 U.S.C. § 119(a) and/or PCT Article 8 to Chinese Patent Application No. 201911109218.X, filed on Nov. 13, 2019, the entire disclosures of which are hereby incorporated by reference.

TECHNICAL FIELD

This disclosure relates to the technical field of audios, and more particularly to a method and apparatus for detecting a valid voice signal and a non-transitory computer readable storage medium.

BACKGROUND

Voice is as a means of human-computer interaction. However, noise interference always exists in a working environment, and the noise may affect application effect of voice. Therefore it is necessary to detect a valid voice signal and distinguish the valid voice signal from a noise interference signal for further processing.

A difference between the voice signal and the noise signal can be reflected in energy. In the case of a high signal-to-noise ratio (SNR), which can be regarded as a ratio of the voice signal to the noise signal, the energy of the voice signal is generally much higher than that of the noise signal. However, in the case of a low SNR, if noise frequently appears in an input audio segment, the energy of the noise signal is relatively high and is almost the same as that of the voice signal. In the related art, a method for detecting a voice signal based on signal energy is adopted to distinguish the voice signal from the noise signal according to short-term energy of the input signal. That is, energy of an input signal in a time period is calculated and then is compared with energy of an input signal in an adjacent time period, to determine whether the signal in the present time period is the voice signal or the noise signal. According to the scheme of the related art, calculate and compare energy of signals in time periods. Due to frequent appearance of noise, noise appears in the signal in the present time period and also appears in the signal in the adjacent time period, energy in the present time period is a sum of energy of the noise signal and energy of the voice signal, and energy in the adjacent time period is also a sum of energy of the noise signal and energy of the voice signal, so existence of noise cannot be detected through comparison. The frequent appearance of the noise makes the energy of the signal increase, which may affect detection of the signal, and accordingly it may be possible to regard the noise as the valid voice signal, so in the related art detection of the valid voice signal may not be accurate.

SUMMARY

In view of above problems, a method, device, and apparatus for detecting a valid voice signal and a non-transitory computer readable storage medium are provided in the disclosure.

According to a first aspect, a method for detecting a valid voice signal is provided in the disclosure. The method includes the following.

A first audio signal of a preset duration is obtained, where the first audio signal includes at least one audio frame signal.

Multiple wavelet decomposition signals respectively corresponding to the at least one audio frame signal are obtained by performing wavelet decomposition on each audio frame signal, where each wavelet decomposition signal contains multiple sample points and an audio intensity value of each sample point.

A wavelet signal sequence is obtained by combining the wavelet decomposition signals corresponding to the at least one audio frame signal according to a framing sequence of the at least one audio frame signal in the first audio signal.

A maximum value and a minimum value among audio intensity values of all sample points in the wavelet signal sequence are obtained, and a first audio intensity threshold is determined according to the maximum value and the minimum value among the audio intensity values of all the sample points in the wavelet signal sequence.

Sample points each having an audio intensity value greater than the first audio intensity threshold in the wavelet signal sequence are obtained, and a signal of sample points in the first audio signal corresponding to the sample points each having an audio intensity value greater than the first audio intensity threshold in the wavelet signal sequence is determined as the valid voice signal.

In some possible embodiments, the first audio intensity threshold is determined according to the maximum value and the minimum value among the audio intensity values of all the sample points in the wavelet signal sequence as follows.

The first audio intensity threshold and a second audio intensity threshold are determined according to the maximum value and the minimum value among the audio intensity values of all the sample points in the wavelet signal sequence, where the first audio intensity threshold is less than the second audio intensity threshold.

The signal of the sample points in the first audio signal corresponding to the sample points each having the audio intensity value greater than the first audio intensity threshold in the wavelet signal sequence is determined as the valid voice signal as follows.

A first sample point in the wavelet signal sequence is obtained, where an audio intensity value of a sample point previous to the first sample point is less than the second audio intensity threshold, and an audio intensity value of the first sample point is greater than the second audio intensity threshold.

A second sample point in the wavelet signal sequence is obtained, where the second sample point is after the first sample point and is the first of sample points each having an audio intensity value less than the first audio intensity threshold in the wavelet signal sequence.

A signal of the sample points in the first audio signal corresponding to sample points from the first sample point to a sample point previous to the second sample point in the wavelet signal sequence is determined as a valid voice segment in the valid voice signal.

Optionally, at least a first preset number of consecutive sample points are included between the second sample point and the first sample point.

In some possible embodiments, the method further includes the following. An average value of first reference audio intensity values of a second preset number of consecutive sample points including a target sample point in the wavelet signal sequence is determined as an audio intensity value of the target sample point.

In some possible embodiments, prior to determining the average value of the first reference audio intensity values of the second preset number of consecutive sample points including the target sample point in the wavelet signal sequence as the audio intensity value of the target sample point, the method further includes the following.

A second reference audio intensity value of the target sample point is obtained by multiplying an audio intensity value of a sample point previous to the target sample point in the wavelet signal sequence by a smoothing coefficient.

A third reference audio intensity value of the target sample point is obtained by multiplying an average value of audio intensity values of sample points that include the target sample point and all consecutive sample points previous to the target sample point in the wavelet signal sequence by a remaining smoothing coefficient.

A sum of the second reference audio intensity value and the third reference audio intensity value is determined as a fourth reference audio intensity value of the target sample point. A minimum value among fourth reference audio intensity values of sample points including the target sample point and all sample points previous to the target sample point in the wavelet signal sequence is determined as the first reference audio intensity value of the target sample point.

In some possible implementations, the maximum value and the minimum value among the audio intensity values of all the sample points in the wavelet signal sequence are obtained as follows.

A value obtained by processing a reference maximum value of each of all the wavelet decomposition signals in the wavelet signal sequence is determined as the maximum value among the audio intensity values of all the sample points in the wavelet signal sequence, and a value obtained by processing a reference minimum value of each of all the wavelet decomposition signals in the wavelet signal sequence is determined as the minimum value among the audio intensity values of all the sample points in the wavelet signal sequence.

For each wavelet decomposition signal, the reference maximum value of the wavelet decomposition signal is obtained according to a maximum value among audio intensity values of all sample points of the wavelet decomposition signal, and the reference minimum value of the wavelet decomposition signal is obtained according to a minimum value among audio intensity values of all sample points of the wavelet decomposition signal.

Optionally, prior to obtaining the first audio signal of the preset duration, the method further includes the following. The first audio signal is obtained by compensating for a high-frequency component in an original audio signal of the preset duration.

In some possible implementations, the wavelet decomposition is performed on each audio frame signal as follows. Wavelet packet decomposition is performed on each audio frame signal, and each signal obtained after the wavelet packet decomposition is determined as the wavelet decomposition signal.

In some possible embodiments, a first audio intensity threshold is determined according to $T_L=\min(\lambda_1\cdot(Sc_{max}-Sc_{min})+Sc_{min}, \lambda_2\cdot Sc_{min})$ and the maximum value and the minimum value among the audio intensity values of all the sample points in the wavelet signal sequence. $Sc_{max}$ represents the maximum value among the audio intensity values of all the sample points in the wavelet signal sequence, $Sc_{min}$ represents the minimum value among the audio intensity values of all the sample points in the wavelet signal sequence, $\lambda_1$ represents a second preset threshold, and $\lambda_2$ represents a third preset threshold.

In some possible implementations, the first audio intensity threshold and the second audio intensity threshold are determined according to the maximum value and the minimum value among the audio intensity values of all the sample points in the wavelet signal sequence as follows.

A first audio intensity threshold is determined according to $T_L=\min(\lambda_1\cdot(Sc_{max}-Sc_{min})+Sc_{min}, \lambda_2\cdot Sc_{min})$ and the maximum value and the minimum value among the audio intensity values of all the sample points in the wavelet signal sequence. $Sc_{max}$ represents the maximum value among the audio intensity values of all the sample points in the wavelet signal sequence, $Sc_{min}$ represents the minimum value among the audio intensity values of all the sample points in the wavelet signal sequence, $\lambda_1$ represents a second preset threshold, and $\lambda_2$ represents a third preset threshold.

The second audio intensity threshold is determined according to $T_U=\alpha T_L$, where $\alpha$ represents a fourth preset threshold and is greater than 1.

According to a second aspect, a device for detecting a voice signal is provided in the disclosure, which includes an obtaining module, a decomposition module, a combining module, and a determining module.

The obtaining module is configured to obtain a first audio signal of a preset duration, where the first audio signal includes at least one audio frame signal.

The decomposition module is configured to obtain multiple wavelet decomposition signals respectively corresponding to the at least one audio frame signal by performing wavelet decomposition on each audio frame signal, where each wavelet decomposition signal contains multiple sample points and an audio intensity value of each sample point.

The combining module is configured to obtain a wavelet signal sequence by combining the wavelet decomposition signals corresponding to the at least one audio frame signal according to a framing sequence of the at least one audio frame signal in the first audio signal.

The determining module is configured to obtain a maximum value and a minimum value among audio intensity values of all sample points in the wavelet signal sequence, and determine a first audio intensity threshold according to the maximum value and the minimum value among the audio intensity values of all the sample points in the wavelet signal sequence.

The determining module is further configured to obtain sample points each having an audio intensity value greater than the first audio intensity threshold in the wavelet signal sequence, and determine a signal of sample points in the first audio signal corresponding to the sample points each having an audio intensity value greater than the first audio intensity threshold in the wavelet signal sequence as the valid voice signal.

In some possible embodiments, the determining module is further configured to determine the first audio intensity threshold and a second audio intensity threshold according to the maximum value and the minimum value among the audio intensity values of all the sample points in the wavelet signal sequence, where the first audio intensity threshold is less than the second audio intensity threshold.

The obtaining module is further configured to obtain a first sample point in the wavelet signal sequence, where an audio intensity value of a sample point previous to the first sample point is less than the second audio intensity threshold, and an audio intensity value of the first sample point is greater than the second audio intensity threshold.

The obtaining module is further configured to obtain a second sample point in the wavelet signal sequence, where the second sample point is after the first sample point and is the first of sample points each having an audio intensity value less than the first audio intensity threshold in the wavelet signal sequence.

The determining module is further configured to determine a signal of the sample points in the first audio signal corresponding to sample points from the first sample point to a sample point previous to the second sample point in the wavelet signal sequence as a valid voice segment in the valid voice signal.

Optionally, at least a first preset number of consecutive sample points are included between the second sample point and the first sample point.

In some possible embodiments, the determining module is further configured to determine an average value of first reference audio intensity values of a second preset number of consecutive sample points including a target sample point in the wavelet signal sequence as an audio intensity value of the target sample point.

In some possible implementations, the device for detecting a voice signal further includes a calculating module. Before the determining module determines the average value of the first reference audio intensity values of the second preset number of consecutive sample points including the target sample point in the wavelet signal sequence as the audio intensity value of the target sample point, the calculating module is configured to obtain a second reference audio intensity value of the target sample point by multiplying an audio intensity value of a sample point previous to the target sample point in the wavelet signal sequence by a smoothing coefficient.

The calculating module is further configured to obtain a third reference audio intensity value of the target sample point by multiplying an average value of audio intensity values of sample points that include the target sample point and all consecutive sample points previous to the target sample point in the wavelet signal sequence by a remaining smoothing coefficient.

The calculating module is further configured to determine a sum of the second reference audio intensity value and the third reference audio intensity value as a fourth reference audio intensity value of the target sample point.

The determining module is further configured to determine a minimum value among fourth reference audio intensity values of sample points including the target sample point and all sample points previous to the target sample point in the wavelet signal sequence as the first reference audio intensity value of the target sample point.

Optionally, the determining module is further configured to determine a value obtained by processing a reference maximum value of each of all the wavelet decomposition signals in the wavelet signal sequence as the maximum value among the audio intensity values of all the sample points in the wavelet signal sequence, and determine a value obtained by processing a reference minimum value of each of all the wavelet decomposition signals in the wavelet signal sequence as the minimum value among the audio intensity values of all the sample points in the wavelet signal sequence.

For each wavelet decomposition signal, the reference maximum value of the wavelet decomposition signal is obtained according to a maximum value among audio intensity values of all sample points of the wavelet decomposition signal, and the reference minimum value of the wavelet decomposition signal is obtained according to a minimum value among audio intensity values of all sample points of the wavelet decomposition signal.

In some possible embodiments, the device 14 for detecting a voice signal further includes a compensating module. Before the obtaining modules obtains the first audio signal of the preset duration, the compensating module is configured to obtain the first audio signal by compensating for a high-frequency component in an original audio signal of the preset duration.

In some possible implementations, the decomposition module is further configured to perform wavelet packet decomposition on each audio frame signal, and determine each signal obtained after the wavelet packet decomposition as the wavelet decomposition signal.

In some possible implementations, the determining module is further configured to determine a first audio intensity threshold according to $T_L=\min(\lambda_1\cdot(Sc_{max}-Sc_{min})+Sc_{min}, \lambda_2\cdot Sc_{min})$ and the maximum value and the minimum value among the audio intensity values of all the sample points in the wavelet signal sequence. $Sc_{max}$ represents the maximum value among the audio intensity values of all the sample points in the wavelet signal sequence, $Sc_{min}$ represents the minimum value among the audio intensity values of all the sample points in the wavelet signal sequence, $\lambda_1$ represents a second preset threshold, and $\lambda_2$ represents a third preset threshold.

In some possible implementations, the determining module is further configured to determine a first audio intensity threshold according to $T_L=\min(\lambda_1\cdot(Sc_{max}-Sc_{min})+Sc_{min}, \lambda_2\cdot Sc_{min})$ and the maximum value and the minimum value among the audio intensity values of all the sample points in the wavelet signal sequence, where $Sc_{max}$ represents the maximum value among the audio intensity values of all the sample points in the wavelet signal sequence, $Sc_{min}$ represents the minimum value among the audio intensity values of all the sample points in the wavelet signal sequence, $\lambda_1$ represents a second preset threshold, and $\lambda_2$ represents a third preset threshold; and determine the second audio intensity threshold according to $T_U=\alpha T_L$, where $\alpha$ represents a fourth preset threshold and is greater than 1.

According to a third aspect, an apparatus for detecting a valid voice signal is provided in the disclosure. The apparatus includes a receiver, a processor, and a memory.

The transceiver is coupled with the processor and the memory, and the processor is further coupled with the memory.

The transceiver is configured to obtain a first audio signal of a preset duration, where the first audio signal includes at least one audio frame signal.

The processor is configured to obtain multiple wavelet decomposition signals respectively corresponding to the at least one audio frame signal by performing wavelet decomposition on each audio frame signal, where each wavelet decomposition signal contains multiple sample points and an audio intensity value of each sample point.

The processor is further configured to obtain a wavelet signal sequence by combining the wavelet decomposition signals corresponding to the at least one audio frame signal according to a framing sequence of the at least one audio frame signal in the first audio signal.

The processor is further configured to obtain a maximum value and a minimum value among audio intensity values of all sample points in the wavelet signal sequence, and determine a first audio intensity threshold according to the maximum value and the minimum value among the audio intensity values of all the sample points in the wavelet signal sequence.

The processor is further configured to obtain sample points each having an audio intensity value greater than the first audio intensity threshold in the wavelet signal sequence, and determine a signal of sample points in the first audio signal corresponding to the sample points each having an audio intensity value greater than the first audio intensity threshold in the wavelet signal sequence as the valid voice signal.

The memory is configured to store computer programs, and the computer programs are invoked by the processor.

In some possible embodiments, the processor is further configured to: determine the first audio intensity threshold and a second audio intensity threshold according to the maximum value and the minimum value among the audio intensity values of all the sample points in the wavelet signal sequence, where the first audio intensity threshold is less than the second audio intensity threshold; obtain a first sample point in the wavelet signal sequence, where an audio intensity value of a sample point previous to the first sample point is less than the second audio intensity threshold, and an audio intensity value of the first sample point is greater than the second audio intensity threshold; obtain a second sample point in the wavelet signal sequence, where the second sample point is after the first sample point and is the first of sample points each having an audio intensity value less than the first audio intensity threshold in the wavelet signal sequence; and determine a signal of the sample points in the first audio signal corresponding to sample points from the first sample point to a sample point previous to the second sample point in the wavelet signal sequence as a valid voice segment in the valid voice signal.

Optionally, at least a first preset number of consecutive sample points are included between the second sample point and the first sample point.

In some possible embodiments, the processor is further configured to determine an average value of first reference audio intensity values of a second preset number of consecutive sample points including a target sample point in the wavelet signal sequence as an audio intensity value of the target sample point.

In some possible embodiments, the processor is further configured to obtain a second reference audio intensity value of the target sample point by multiplying an audio intensity value of a sample point previous to the target sample point in the wavelet signal sequence by a smoothing coefficient; obtain a third reference audio intensity value of the target sample point by multiplying an average value of audio intensity values of sample points that include the target sample point and all consecutive sample points previous to the target sample point in the wavelet signal sequence by a remaining smoothing coefficient; determine a sum of the second reference audio intensity value and the third reference audio intensity value as a fourth reference audio intensity value of the target sample point; and determine a minimum value among fourth reference audio intensity values of sample points including the target sample point and all sample points previous to the target sample point in the wavelet signal sequence as the first reference audio intensity value of the target sample point.

In some possible implementations, the processor is further configured to determine a value obtained by processing a reference maximum value of each of all the wavelet decomposition signals in the wavelet signal sequence as the maximum value among the audio intensity values of all the sample points in the wavelet signal sequence, and determine a value obtained by processing a reference minimum value of each of all the wavelet decomposition signals in the wavelet signal sequence as the minimum value among the audio intensity values of all the sample points in the wavelet signal sequence, where for each wavelet decomposition signal, the reference maximum value of the wavelet decomposition signal is obtained according to a maximum value among audio intensity values of all sample points of the wavelet decomposition signal, and the reference minimum value of the wavelet decomposition signal is obtained according to a minimum value among audio intensity values of all sample points of the wavelet decomposition signal.

Optionally, the processor is further configured to obtain the first audio signal by compensating for a high-frequency component in an original audio signal of the preset duration.

In some possible embodiments, the processor is further configured to perform wavelet packet decomposition on each audio frame signal, and determine each signal obtained after the wavelet packet decomposition as the wavelet decomposition signal.

In some possible implementations, the processor is configured to determine a first audio intensity threshold according to $T_L=\min(\lambda_1\cdot(Sc_{max}-Sc_{min})+Sc_{min}, \lambda_2\cdot Sc_{min})$ and the maximum value and the minimum value among the audio intensity values of all the sample points in the wavelet signal sequence. $Sc_{max}$ represents the maximum value among the audio intensity values of all the sample points in the wavelet signal sequence, $Sc_{min}$ represents the minimum value among the audio intensity values of all the sample points in the wavelet signal sequence, $\lambda_1$ represents a second preset threshold, and $\lambda_2$ represents a third preset threshold.

In some possible implementations, the processor is configured to determine a first audio intensity threshold according to $T_L=\min(\lambda_1\cdot(Sc_{max}-Sc_{min})+Sc_{min}, \lambda_2\cdot Sc_{min})$ and the maximum value and the minimum value among the audio intensity values of all the sample points in the wavelet signal sequence, where $Sc_{max}$ represents the maximum value among the audio intensity values of all the sample points in the wavelet signal sequence, $Sc_{min}$ represents the minimum value among the audio intensity values of all the sample points in the wavelet signal sequence, $\lambda_1$ represents a second preset threshold, and $\lambda_2$ represents a third preset threshold; and determine the second audio intensity threshold according to $T_U=\alpha T_L$, where $\alpha$ represents a fourth preset threshold and is greater than 1.

According to a fourth aspect, a non-transitory computer readable storage medium is provided in the disclosure. The readable storage medium stores instructions which, when executed on a computer, can perform operations of the method described in the above aspect.

DETAILED DESCRIPTION

Technical solutions embodied in embodiments of the disclosure will be described in a clear and comprehensive manner in conjunction with accompanying drawings of the embodiments of the disclosure. It is evident that the embodiments described herein are some rather than all the embodiments of the disclosure. All other embodiments obtained by those of ordinary skill in the art based on the embodiments of the disclosure without creative efforts shall fall within the protection scope of the disclosure.

Implementations of the technical solutions of the disclosure will be further described in detail below in conjunction with accompanying drawings.

Referring to FIGS. 1-6, a method for detecting a valid voice signal provided in the disclosure is first illustrated below.

Figure 1:
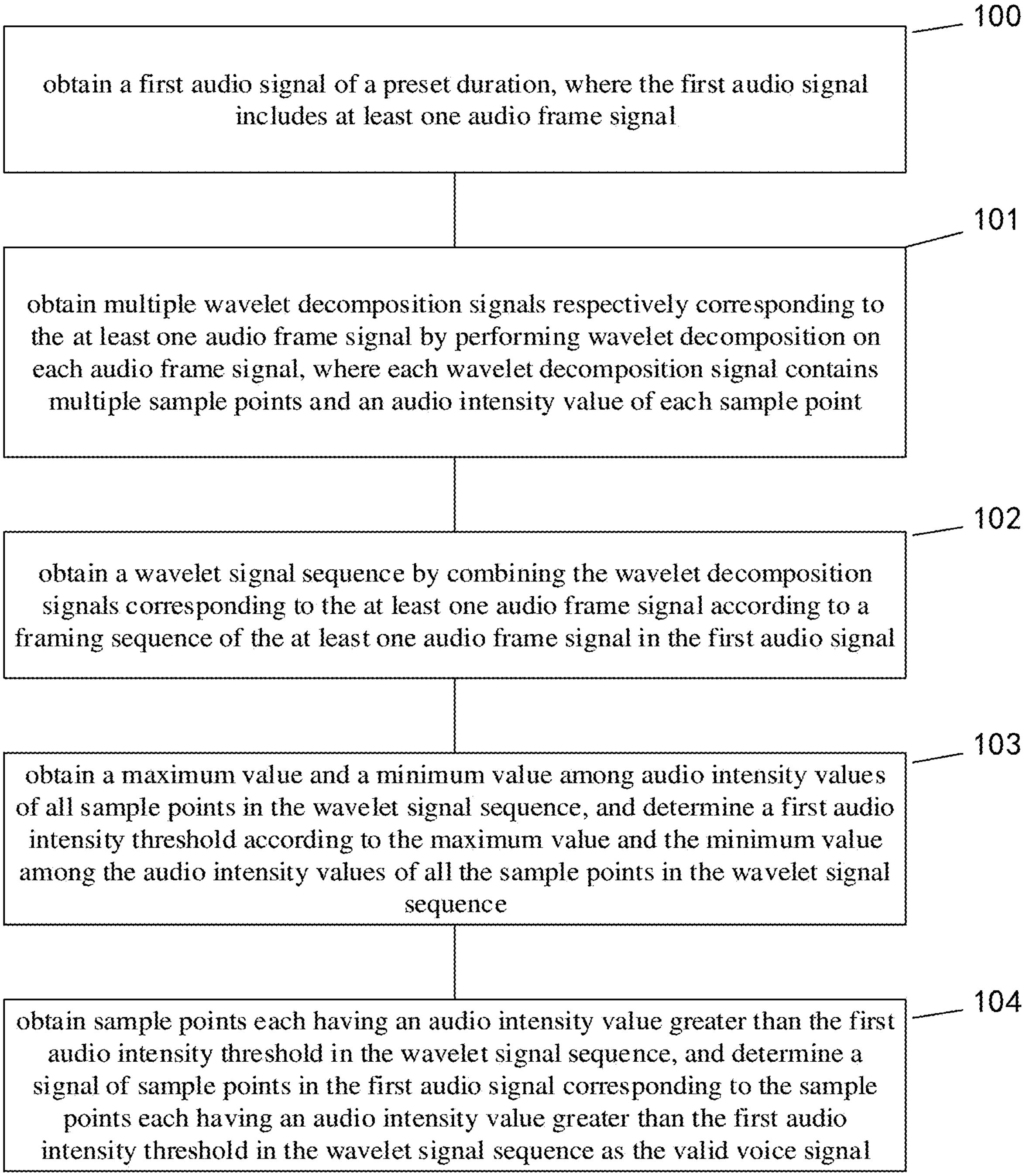
FIG. 1 is a schematic flow chart illustrating a method for detecting a valid voice signal provided in embodiments of the disclosure.

Referring to FIG. 1, FIG. 1 is a schematic flow chart illustrating a method for detecting a valid voice signal provided in embodiments of the disclosure. As illustrated in FIG. 1, specific execution operations of embodiments are as follows.

At 100, a first audio signal of a preset duration is obtained, where the first audio signal includes at least one audio frame signal. Specifically, a device for detecting a valid voice signal obtains the first audio signal of the preset duration. Since movement of oral muscles is relatively slow relative to a voice frequency, and voice signal is relatively stable in a short time range, the voice signal has short-term stability. Therefore, the voice signal can be segmented into segments for detection according to the short-term stability of the voice signal. That is, framing is performed on the first audio signal of the preset duration to obtain at least one audio frame signal. Optionally, there is no overlap between audio frame signals, and a frame shift is the same as a frame length. It can be understood that the frame shift can be regarded as an overlap between a previous frame and a next frame. When the frame length equals the frame shift, there is no overlap between audio frames. In some possible embodiments, the device for detecting a valid voice signal samples the voice signal at a frequency of 16 kHz, i.e., collects 16 k sample points in one second. Thereafter, a first audio signal with the preset duration of 5 seconds is obtained, and then framing is performed on the first audio signal with 10 ms as the frame shift and 10 ms as the frame length. Therefore, each audio frame signal includes 160 sample points, and an audio intensity value of each of the 160 sample points is obtained.

At 101, multiple wavelet decomposition signals respectively corresponding to the at least one audio frame signal are obtained by performing wavelet decomposition on each audio frame signal, where each wavelet decomposition signal contains multiple sample points and an audio intensity value of each sample point. Specifically, at 100, the first audio signal is obtained, framing is performed on the first audio signal to obtain audio frame signals, and then the wavelet decomposition is performed on each audio frame signal.

Figure 2:
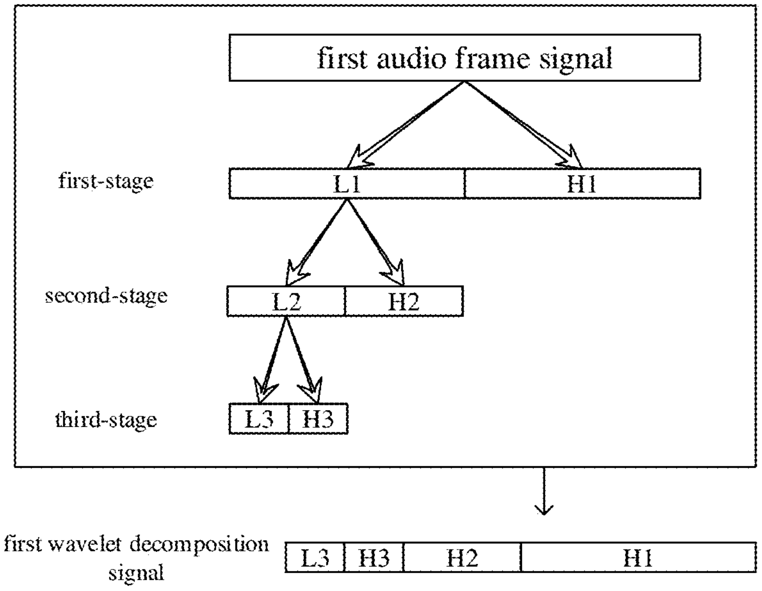
FIG. 2 is a schematic structural diagram illustrating wavelet decomposition provided in embodiments of the disclosure.
Figure 3:
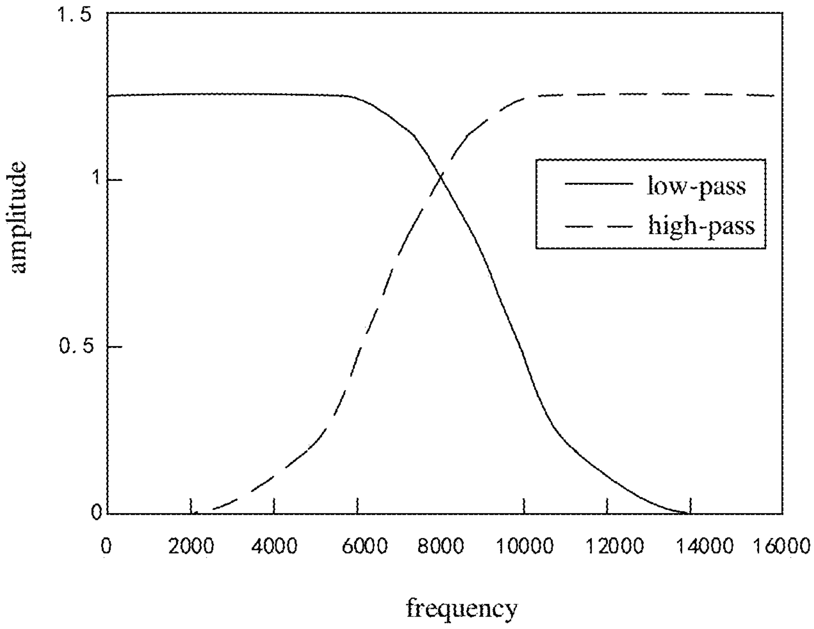
FIG. 3 illustrates an amplitude-frequency characteristic curve of a high-pass filter and an amplitude-frequency characteristic curve of a low-pass filter provided in embodiments of the disclosure.
Figure 4:
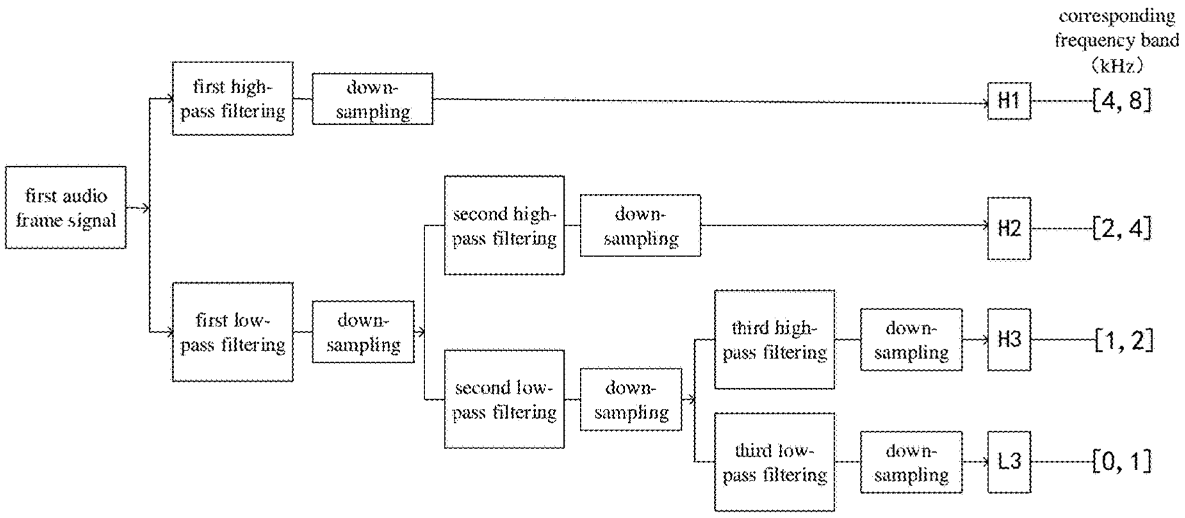
FIG. 4 is a schematic diagram illustrating processing of wavelet decomposition provided in embodiments of the disclosure.

The wavelet decomposition is illustrated in detail below. The wavelet decomposition is illustrated in FIG. 2 to FIG. 4. Referring to FIG. 2, FIG. 2 is a schematic structural diagram illustrating wavelet decomposition provided in embodiments of the disclosure. As illustrated in FIG. 2, perform wavelet decomposition on the audio frame signal obtained by performing the framing on the first audio signal. In embodiments, a first audio frame signal is taken as an example for illustration. It can be understood that the wavelet decomposition can be regarded as a process of high-pass and low-pass filtering. Specific high-pass and low-pass filtering characteristics are illustrated in FIG. 3, and FIG. 3 illustrates an amplitude-frequency characteristic curve of a high-pass filter and an amplitude-frequency characteristic curve of a low-pass filter provided in embodiments of the disclosure. It can be understood that the high-pass and low-pass filtering characteristics vary according to models of selected filters. For example, a 16-tap Daubechies 8 wavelet may be adopted. A first-stage wavelet decomposition signal is obtained through the high-pass filter and the low-pass filter illustrated in FIG. 3, where the first-stage wavelet decomposition signal includes low-frequency information L1 and high-frequency information H1. Proceed to performing high-pass filtering on low-frequency information L1 in the first-stage wavelet decomposition signal to obtain high-frequency information H2 in a second-stage wavelet decomposition signal and performing low-pass filtering on low-frequency information L1 to obtain low-frequency information L2 in the second-stage wavelet decomposition signal. Proceed to performing high-pass filtering on low-frequency information L2 in the second-stage wavelet decomposition signal to obtain high-frequency information H3 in a third-stage wavelet decomposition signal and performing low-pass filtering on low-frequency information L2 to obtain low-frequency information L3 in the third-stage wavelet decomposition signal. In above manners, perform multi-stage wavelet decomposition on the input signal. The above is merely for exemplary illustration. It can be understood that since L3 and H3 contain all information of L2, L2 and H2 contain all information of L1, and L1 and H1 contain all information of the first audio frame signal, a sub-wavelet signal sequence formed by combining L3, H3, H2, and H1 can represent the first audio frame signal. Sub-wavelet signal sequences of multiple audio frame signals are combined according to a framing sequence of the first audio signal to form a wavelet signal sequence representing the first audio signal. As can be seen, a low-frequency component in the first audio frame signal is subjected to refined analysis through wavelet decomposition, the resolution is improved, thereby having a relatively wide analysis window in the low frequency band and excellent local microscopic characteristics.

Specific processing of the wavelet decomposition in embodiments is illustrated in detail below. In embodiments, take performing the wavelet decomposition on one audio frame signal as an example for illustration. Specifically, referring to FIG. 4, FIG. 4 is a schematic diagram illustrating processing of wavelet decomposition provided in embodiments of the disclosure. As illustrated in FIG. 4, the wavelet decomposition is performed on the first audio frame signal. In some possible implementations, to make the number of sample points after the wavelet decomposition be consistent with the number of sample points of an original audio frame signal, a signal after high-pass filtering and a signal after low-pass filtering can be down-sampled. 16 kHz is taken as the sampling frequency of the first audio signal and framing is performed on the first audio signal with 10 ms as the frame shift and 10 ms as the frame length, such that each audio frame signal includes 160 sample points. The wavelet decomposition is performed on each audio frame signal, the number of sample points obtained after first high-pass filtering is 160, and the number of sample points obtained after first low-pass filtering is also 160, which form a first-stage wavelet decomposition signal. Thereafter, down-sampling is performed on a signal obtained after the first low-pass filtering, where α sampling frequency used after the first low-pass filtering is half of a sampling frequency of the first audio frame signal, and therefore the number of sample points obtained after the first low-pass filtering and the down-sampling is 80. Similarly, the number of sample points obtained after the first high-pass filtering and down-sampling is 80. Therefore, the number of sample points of the first-stage wavelet decomposition signal is equal to a sum (i.e., 160) of the number of the sample points obtained after the first low-pass filtering and the down-sampling and the number of the sample points obtained after the first high-pass filtering and the down-sampling, which is consistent with the number of sample points of one audio frame signal. In above manners, perform second high-pass filtering and second low-pass filtering on the signal obtained after the first low-pass filtering and the down-sampling and then perform down-sampling, such that a sum of the number of sample points obtained after the second low-pass filtering and the down-sampling and the number of sample points obtained after the second high-pass filtering and the down-sampling is equal to the number of sample points obtained after the first low-pass filtering and the down-sampling. Perform third high-pass filtering and third low-pass filtering on a signal obtained after the second low-pass filtering and the down-sampling, and then perform down-sampling, such that a sum of the number of sample points obtained after the third low-pass filtering and the down-sampling and the number of sample points obtained after the third high-pass filtering and the down-sampling is equal to the number of the sample points obtained after the second low-pass filtering and the down-sampling. As can be seen, the number of sample points of the sub-wavelet signal sequence obtained after the first audio frame signal is subjected to the wavelet decomposition is equal to the number of the sample points of the first audio frame signal. It can be understood that according to the double sampling theory, the sampling frequency is twice the highest frequency of the voice signal, and therefore the voice signal collected with the sampling frequency of 16 kHz corresponds to the highest frequency of 8 kHz. First-stage wavelet decomposition is performed on the first audio frame signal to obtain the first-stage wavelet decomposition signal. The first-stage wavelet decomposition signal includes a signal obtained after the first high-pass filtering and the down-sampling and a signal obtained after the first low-pass filtering and the down-sampling. A frequency band corresponding to the signal obtained after the first low-pass filtering and the down-sampling is 0 to 4 kHz, and a frequency band corresponding to wavelet signal H1 obtained after the first high-pass filtering and the down-sampling is 4 kHz to 8 kHz. Second-stage wavelet decomposition is performed on the first-stage wavelet decomposition signal to obtain a second-stage wavelet decomposition signal. Specifically, the second high-pass filtering and the second low-pass filtering are respectively performed on the signal obtained after the first low-pass filtering and the down-sampling, a frequency band corresponding to wavelet signal H2 obtained after the second high-pass filtering and down-sampling is 2 kHz to 4 kHz, and a frequency band corresponding to the signal obtained after the second low-pass filtering and down-sampling is 0 to 2 kHz. Third-stage wavelet decomposition is performed on the second-stage wavelet decomposition signal to obtain a third-stage wavelet decomposition signal. Specifically, the third high-pass filtering and third low-pass filtering are respectively performed on the signal obtained after the second low-pass filtering and the down-sampling, a frequency band corresponding to wavelet signal H3 obtained after the third high-pass filtering and down-sampling is 1 kHz to 2 kHz, and a frequency band corresponding to wavelet signal L3 obtained after the third low-pass filtering and down-sampling is 0 to 1 kHz, and so on. In embodiments, three-stage wavelet decomposition is taken as an example for illustration. In some possible implementations, all the first-stage wavelet decomposition signal, the second-stage wavelet decomposition signal, and the third-stage wavelet decomposition signal can be obtained by performing high-pass filtering and low-pass filtering with filters of a same type. Wavelet signals H1, H2, H3, and L3 may be combined into the sub-wavelet signal sequence, which can be determined as the wavelet decomposition signal of the first audio frame signal.

In some possible embodiments, the wavelet decomposition is performed on each audio frame signal as follows. Wavelet packet decomposition is performed on each audio frame signal, and each signal obtained after the wavelet packet decomposition is determined as the wavelet decomposition signal.

Figure 5:
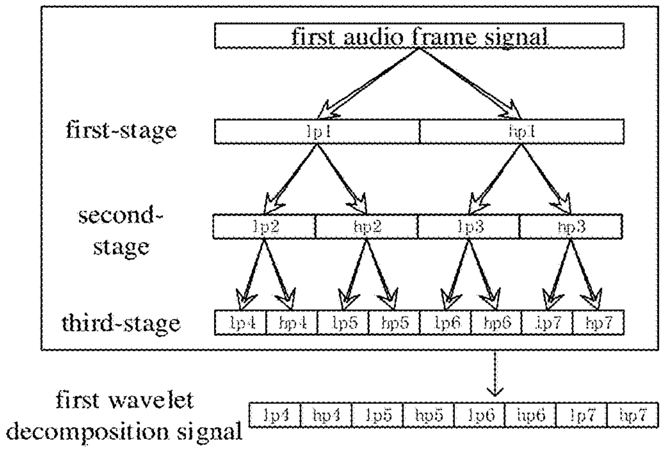
FIG. 5 is a schematic structural diagram illustrating wavelet packet decomposition provided in embodiments of the disclosure.

The wavelet packet decomposition is illustrated in detail below. The wavelet packet decomposition may be illustrated in FIG. 5 and FIG. 6. Referring to FIG. 5, FIG. 5 is a schematic structural diagram illustrating wavelet packet decomposition provided in embodiments of the disclosure. As illustrated in FIG. 5, perform the wavelet packet decomposition on the audio frame signal obtained by performing framing on the first audio signal. In embodiments, the first audio frame signal is taken as an example for illustration. It can be understood that the wavelet packet decomposition can be regarded as a process of high-pass and low-pass filtering. Specific high-pass and low-pass filtering characteristics are illustrated in FIG. 3. Optionally, a type of the filter may be a 16-tap Daubechies 8 wavelet. Different from the wavelet decomposition, with the wavelet packet decomposition, not only a low-frequency signal can be decomposed, but also a high-frequency signal can be decomposed, and thus for a signal containing a large number of middle-frequency and high-frequency information, a relatively good time-frequency localization analysis can be achieved through the wavelet packet decomposition. A first-stage wavelet decomposition signal is obtained through the high-pass filter and the low-pass filter. The first-stage wavelet decomposition signal includes low-frequency information lp1 and high-frequency information hp1. Proceed to performing high-pass filtering on low-frequency information lp1 in the first-stage wavelet decomposition signal to obtain high-frequency information hp2 and performing low-pass filtering on low-frequency information lp1 to obtain low-frequency information lp2. Different from the wavelet decomposition, with the wavelet packet decomposition, high-pass filtering and low-pass filtering may also be respectively performed on high-frequency information obtained after decomposition. Therefore, proceed to performing high-pass filtering on high-frequency information hp1 in the first-stage wavelet decomposition signal to obtain high-frequency information hp3, and performing low-pass filtering on high-frequency information hp1 to obtain low-frequency information lp3. In a second-stage wavelet decomposition signal, low-frequency information includes lp2 and lp3, and high-frequency information includes hp2 and hp3. The high-pass filtering and the low-pass filtering are respectively performed on low-frequency information lp2, low-frequency information lp3, high-frequency information hp2, and high-frequency information hp3 in the second-stage wavelet decomposition signal, to obtain a third-stage wavelet decomposition signal. The third-stage wavelet decomposition signal includes low-frequency information lp4, lp5, lp6, and lp7 and high-frequency information hp4, hp5, hp6, and hp7. In above manners, perform multi-stage wavelet packet decomposition on the input signal. The above is merely for illustration. As illustrated in FIG. 5, since lp4 and hp4 contain all information of lp2, lp5 and hp5 contain all information of hp2, and lp2 and hp2 contain all information of lp1, lp4, hp4, lp5, and hp5 contain all information of lp1. Since lp6 and hp6 contain all information of lp3, lp7 and hp7 contain all information of hp3, and lp3 and hp3 contain all information of hp1, lp6, hp6, lp7, and hp7 contain all information of hp1. Since lp1 and hp1 contain all the information of the first audio frame signal, a sub-wavelet signal sequence obtained by combining lp4, hp4, lp5, hp5, lp6, hp6, lp7, and hp7 can represent the first audio frame signal. Sub-wavelet signal sequences of all the audio frame signals are combined according to a framing sequence of the audio frame signals in the first audio signal to obtain the wavelet signal sequence representing the first audio signal. As can be seen, after the wavelet packet decomposition, resolution of both high-frequency and low-frequency components of the first audio frame signal is improved.

Figure 6:
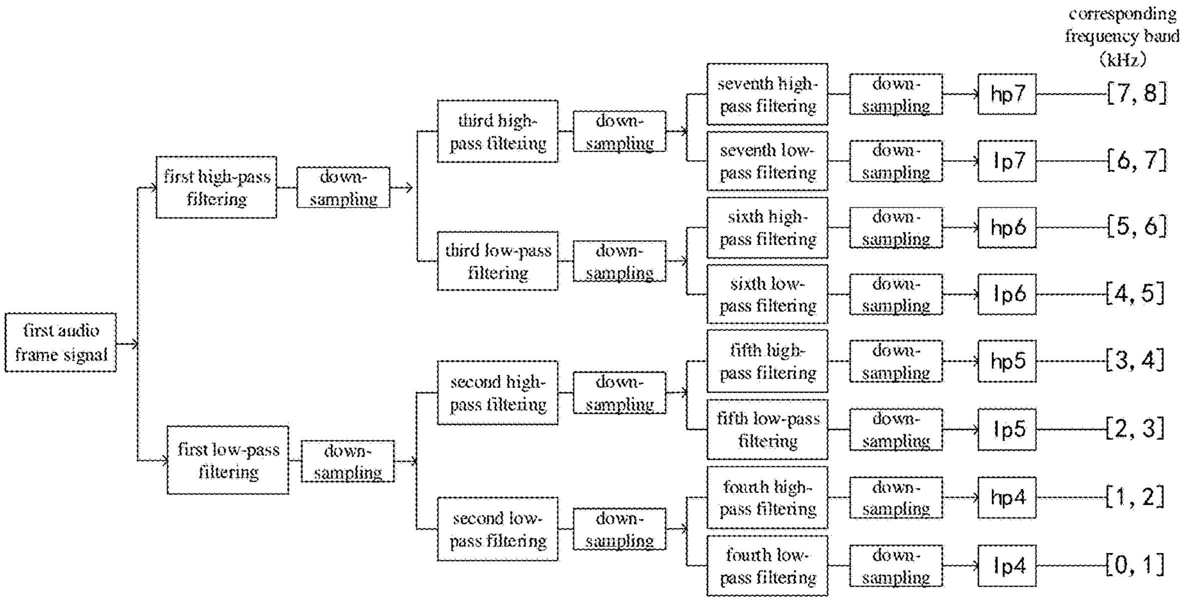
FIG. 6 is a schematic diagram illustrating processing of wavelet packet decomposition provided in embodiments of the disclosure.

Specific processing of the wavelet packet decomposition in embodiments is illustrated in detail below. In embodiments, take performing the wavelet packet decomposition on one audio frame signal as an example for illustration. Specifically, referring to FIG. 6, FIG. 6 is a schematic diagram illustrating processing of wavelet packet decomposition provided in embodiments of the disclosure. As illustrated in FIG. 6, the wavelet packet decomposition is performed on the first audio frame signal. In some possible implementations, to make the number of sample points after the wavelet packet decomposition be consistent with the number of sample points of the original audio frame signal, a signal after high-pass filtering and a signal after low-pass filtering can be down-sampled. 16 kHz is taken as the sampling frequency of the first audio signal and framing is performed on the first audio signal with 10 ms as the frame shift and 10 ms as the frame length, such that each audio frame signal includes 160 sample points. The wavelet packet decomposition is performed on each audio frame signal, the number of sample points obtained after first high-pass filtering is 160, and the number of sample points obtained after first low-pass filtering is also 160. A signal obtained after the first high-pass filtering and a signal obtained after the first low-pass filtering form a first-stage wavelet decomposition signal after the wavelet packet decomposition. Thereafter, down-sampling is performed on the signal obtained after the first low-pass filtering, where α sampling frequency used after the first low-pass filtering is half of a sampling frequency of the first audio frame signal, and therefore the number of sample points obtained after the first low-pass filtering and the down-sampling is 80. Similarly, the number of sample points obtained after the first high-pass filtering and down-sampling is 80. Therefore, the number of sample points of the first-stage wavelet decomposition signal is equal to a sum (i.e., 160) of the number of the sample points obtained after the first low-pass filtering and the down-sampling and the number of the sample points obtained after the first high-pass filtering and the down-sampling, which is consistent with the number of sample points of one audio frame signal. In above manners, perform second high-pass filtering and second low-pass filtering on the signal obtained after the first low-pass filtering and the down-sampling, and then perform down-sampling, such that a sum of the number of sample points obtained after the second low-pass filtering and the down-sampling and the number of sample points obtained after the second high-pass filtering and the down-sampling is equal to the number of the sample points obtained after the first low-pass filtering and the down-sampling. Perform third high-pass filtering and third low-pass filtering on a signal obtained after the first high-pass filtering and the down-sampling, and then perform down-sampling, such that a sum of the number of sample points obtained after the third low-pass filtering and the down-sampling and the number of sample points obtained after the third high-pass filtering and the down-sampling is equal to the number of the sample points obtained after the first high-pass filtering and the down-sampling. Perform fourth high-pass filtering and fourth low-pass filtering on a signal obtained after the second low-pass filtering and the down-sampling, and then perform down-sampling, such that a sum of the number of sample points obtained after the fourth low-pass filtering and the down-sampling and the number of sample points obtained after the fourth high-pass filtering and the down-sampling is equal to the number of the sample points obtained after the second low-pass filtering and the down-sampling. Perform fifth high-pass filtering and fifth low-pass filtering on a signal obtained after the second high-pass filtering and the down-sampling, and then perform down-sampling, such that a sum of the number of sample points obtained after the fifth low-pass filtering and the down-sampling and the number of sample points obtained after the fifth high-pass filtering and the down-sampling is equal to the number of the sample points obtained after the second high-pass filtering and the down-sampling. Perform sixth high-pass filtering and sixth low-pass filtering on a signal obtained after the third low-pass filtering and the down-sampling, and then perform down-sampling, such that a sum of the number of sample points obtained after the sixth low-pass filtering and the down-sampling and the number of sample points obtained after the sixth high-pass filtering and the down-sampling is equal to the number of the sample points obtained after the third low-pass filtering and the down-sampling. Perform seventh high-pass filtering and seventh low-pass filtering on a signal obtained after the third high-pass filtering and the down-sampling, and then perform down-sampling, such that a sum of the number of sample points obtained after the seventh low-pass filtering and the down-sampling and the number of sample points obtained after the seventh high-pass filtering and the down-sampling is equal to the number of the sample points obtained after the third high-pass filtering and the down-sampling. As can be seen, the number of sample points of the sub-wavelet signal sequence obtained after the wavelet packet decomposition is performed on the first audio frame signal is equal to the number of the sample points of the first audio frame signal. It can be understood that, according to the double sampling theory, the sampling frequency is twice the highest frequency of the voice signal, and therefore the voice signal collected with the sampling frequency of 16 kHz corresponds to the highest frequency of 8 kHz. First-stage wavelet packet decomposition is performed on the first audio frame signal to obtain the first-stage wavelet decomposition signal. The first-stage wavelet decomposition signal includes a signal obtained after the first high-pass filtering and the down-sampling and a signal obtained after the first low-pass filtering and the down-sampling. A frequency band corresponding to the signal obtained after the first low-pass filtering and the down-sampling is 0 to 4 kHz, and a frequency band corresponding to the signal obtained after the first high-pass filtering and the down-sampling is 4 kHz to 8 kHz. Second-stage wavelet packet decomposition is performed on the first-stage wavelet decomposition signal to obtain a second-stage wavelet decomposition signal. The second-stage wavelet decomposition signal includes a signal obtained after second low-pass filtering and down-sampling, a signal obtained after second high-pass filtering and down-sampling, a signal obtained after third low-pass filtering and down-sampling, and a signal obtained after third high-pass filtering and down-sampling. Specifically, the second high-pass filtering and the second low-pass filtering are respectively performed on the signal obtained after the first low-pass filtering and the down-sampling, a frequency band corresponding to the signal obtained after the second high-pass filtering and the down-sampling is 2 kHz to 4 kHz, and a frequency band corresponding to the signal obtained after the second low-pass filtering and the down-sampling is 0 to 2 kHz. The third high-pass filtering and the third low-pass filtering are respectively performed on the signal obtained after the first high-pass filtering and the down-sampling, a frequency band corresponding to the signal obtained after the third high-pass filtering and the down-sampling is 6 kHz to 8 kHz, and a frequency band corresponding to the signal obtained after the third low-pass filtering and the down-sampling is 4 kHz to 6 kHz. Third-stage wavelet packet decomposition is performed on the second-stage wavelet decomposition signal to obtain a third-stage wavelet decomposition signal. The third-stage wavelet decomposition signal includes a signal obtained after fourth low-pass filtering and down-sampling, a signal obtained after fourth high-pass filtering and down-sampling, a signal obtained after fifth low-pass filtering and down-sampling, a signal obtained after fifth high-pass filtering and down-sampling, a signal obtained after sixth low-pass filtering and down-sampling, a signal obtained after sixth high-pass filtering and down-sampling, a signal obtained after seventh low-pass filtering and down-sampling, and a signal obtained after seventh high-pass filtering and down-sampling. Specifically, the fourth low-pass filtering and the fourth high-pass filtering are respectively performed on the signal obtained after the second low-pass filtering and the down-sampling, a frequency band corresponding to wavelet packet signal lp4 obtained after the fourth low-pass filtering and the down-sampling is 0 to 1 kHz, and a frequency band corresponding to wavelet packet signal hp4 obtained after the fourth high-pass filtering and the down-sampling is 1 kHz to 2 kHz. The fifth low-pass filtering and the fifth high-pass filtering are respectively performed on the wavelet packet signal obtained after the second high-pass filtering and the down-sampling, a frequency band corresponding to wavelet packet signal lp5 obtained after the fifth low-pass filtering and the down-sampling is 2 kHz to 3 kHz, and a frequency band corresponding to wavelet packet signal hp5 obtained after the fifth high-pass filtering and the down-sampling is 3 kHz to 4 kHz. Similarly, the sixth high-pass filtering and the sixth low-pass filtering are respectively performed on the signal obtained after the third low-pass filtering and the down-sampling, a frequency band corresponding to wavelet packet signal lp6 obtained after the sixth low-pass filtering and the down-sampling is 4 kHz to 5 kHz, and a frequency band corresponding to wavelet packet signal hp6 obtained after the sixth high-pass filtering and the down-sampling is 5 kHz to 6 kHz. The seventh low-pass filtering and the seventh high-pass filtering are respectively performed on the wavelet packet signal obtained after the third high-pass filtering and the down-sampling, a frequency band corresponding to wavelet packet signal lp7 obtained after the seventh low-pass filtering and the down-sampling is 6 kHz to 7 kHz, and a frequency band corresponding to wavelet packet signal hp7 obtained after the seventh high-pass filtering and the down-sampling is 7 kHz to 8 kHz, and so on. In embodiments, three-stage wavelet packet decomposition is taken as an example for illustration. Different from the wavelet decomposition, with the wavelet packet decomposition, high-pass filtering and low-pass filtering may also be respectively performed on a high-frequency signal in each stage signal obtained after high-pass filtering. Wavelet packet signals lp4, hp4, lp5, hp5, lp6, hp6, lp7, and hp7 in the third-stage wavelet decomposition signal may be combined into the sub-wavelet signal sequence, which can be determined as the wavelet decomposition signal of the first audio frame signal. In some possible implementations, all the first-stage wavelet decomposition signal, the second-stage wavelet decomposition signal, and the third-stage wavelet decomposition signal can be obtained by performing high-pass filtering and low-pass filtering with filters of a same type.

At 102, a wavelet signal sequence is obtained by combining the wavelet decomposition signals corresponding to the at least one audio frame signal according to a framing sequence of the at least one audio frame signal in the first audio signal. Specifically, the wavelet decomposition signal of the first audio frame signal is obtained according to operations at 101, wavelet decomposition signals of all audio frame signals in the first audio signal are obtained, and then the wavelet decomposition signals of all the audio frame signals are sequentially combined according to the framing sequence of the first audio signal described at 100 to obtain the wavelet signal sequence representing information of the first audio signal.

At 103, a maximum value and a minimum value among audio intensity values of all sample points in the wavelet signal sequence are obtained, and a first audio intensity threshold is determined according to the maximum value and the minimum value among the audio intensity values of all the sample points in the wavelet signal sequence. Specifically, for each of all the sample points in the wavelet signal sequence, a sample point value of the sample point represents a voltage amplitude value of the sample point. In some possible implementations, the audio intensity value may be the voltage amplitude value of the sample point. In other possible implementations, the audio intensity value may be an energy value of the sample point. The energy value of the sample point is obtained by squaring the voltage amplitude value of the sample point. The first audio intensity threshold which is used for determination of the valid voice signal is determined according to the maximum value and the minimum value among the audio intensity values of all the sample points in the wavelet signal sequence. In some possible implementations, the device for detecting a valid voice signal determines the first audio intensity threshold $T_L$ according to $T_L=\min(\lambda_1 \cdot (Sc_{max}-Sc_{min})+Sc_{min}, \lambda_2 \cdot Sc_{min})$ and the maximum value and the minimum value among the audio intensity values of all the sample points in the wavelet signal sequence. $Sc_{max}$ represents the maximum value among the audio intensity values of all the sample points in the wavelet signal sequence, $Sc_{min}$ represents the minimum value among the audio intensity values of all the sample points in the wavelet signal sequence, $\lambda_1$ represents a second preset threshold, and $\lambda_2$ represents a third preset threshold. In one example, $\lambda_1$ is 0.04, and $\lambda_2$ is 50.

In some possible embodiments, the maximum value and the minimum value among the audio intensity values of all the sample points in the wavelet signal sequence are obtained as follows. A first reference maximum value and a first reference minimum value among audio intensity values of all sample points of a first wavelet decomposition signal in the wavelet signal sequence are obtained. A value obtained by processing a reference maximum value of each of all the wavelet decomposition signals in the wavelet signal sequence is determined as the maximum value among the audio intensity values of all the sample points in the wavelet signal sequence, where for each wavelet decomposition signal, the reference maximum value of the wavelet decomposition signal is obtained according to a maximum value among audio intensity values of all sample points of the wavelet decomposition signal. A value obtained by processing a reference minimum value of each of all the wavelet decomposition signals in the wavelet signal sequence is determined as the minimum value among the audio intensity values of all the sample points in the wavelet signal sequence, where for each wavelet decomposition signal, the reference minimum value of the wavelet decomposition signal is obtained according to a minimum value among audio intensity values of all sample points of the wavelet decomposition signal. Specifically, the wavelet signal sequence includes multiple wavelet decomposition signals, and a maximum value and a minimum value of all sample points of each wavelet decomposition signal are obtained. Optionally, an average value of the maximum values in all the wavelet decomposition signals is determined as the maximum value among the audio intensity values of all the sample points in the wavelet signal sequence. An average value of the minimum values in all the wavelet decomposition signals is determined as the minimum value among the audio intensity values of all the sample points in the wavelet signal sequence. According to the embodiments, the maximum value and the minimum value in the wavelet signal sequence are optimized, such that the sample points in the wavelet signal sequence can be further analyzed to optimize detection effect of the valid voice signal.

At 104, sample points each having an audio intensity value greater than the first audio intensity threshold in the wavelet signal sequence are obtained, and a signal of sample points in the first audio signal corresponding to the sample points each having an audio intensity value greater than the first audio intensity threshold in the wavelet signal sequence is determined as the valid voice signal.

In some possible embodiments, prior to obtaining the first audio signal of the preset duration, the method further includes the following. The first audio signal is obtained by compensating for a high-frequency component in an original audio signal of the preset duration. Specifically, due to loss of high-frequency components in voice signal during lip pronunciation or microphone recording and great loss of the signal during transmission with the increase of a signal rate, to obtain a relatively good signal waveform at a receiving terminal, the loss signal needs to be compensated. In some possible implementations, the original audio signal of the preset duration is pre-emphasized. That is, the first audio signal is processed according to $y(n)=x(n)-ax(n-1)$, where $x(n)$ represents an audio intensity value of a sample point of the original audio signal at time n, $x(n-1)$ represents an audio intensity value of a sample point of the original audio signal at time $n-1$, a represents a pre-emphasis coefficient (for example, a is greater than 0.9 and less than 1), which can be deemed as the first preset threshold, and $y(n)$ represents a signal subjected to pre-emphasizing. It can be understood that, it can be considered that the pre-emphasizing is to compensate for high-frequency components by passing the first audio signal through a high-pass filter, such that the loss of the high-frequency components caused by lip articulation or microphone recording can be reduced.

According to embodiments, by collecting the energy information of all the sample points in the wavelet signal sequence, the audio intensity threshold is determined according to the energy distribution of the wavelet signal sequence, and determination and detection of the valid voice signal may be realized according to the audio intensity threshold, thereby improving the accuracy of the detection of the valid voice signal.

Figure 7:
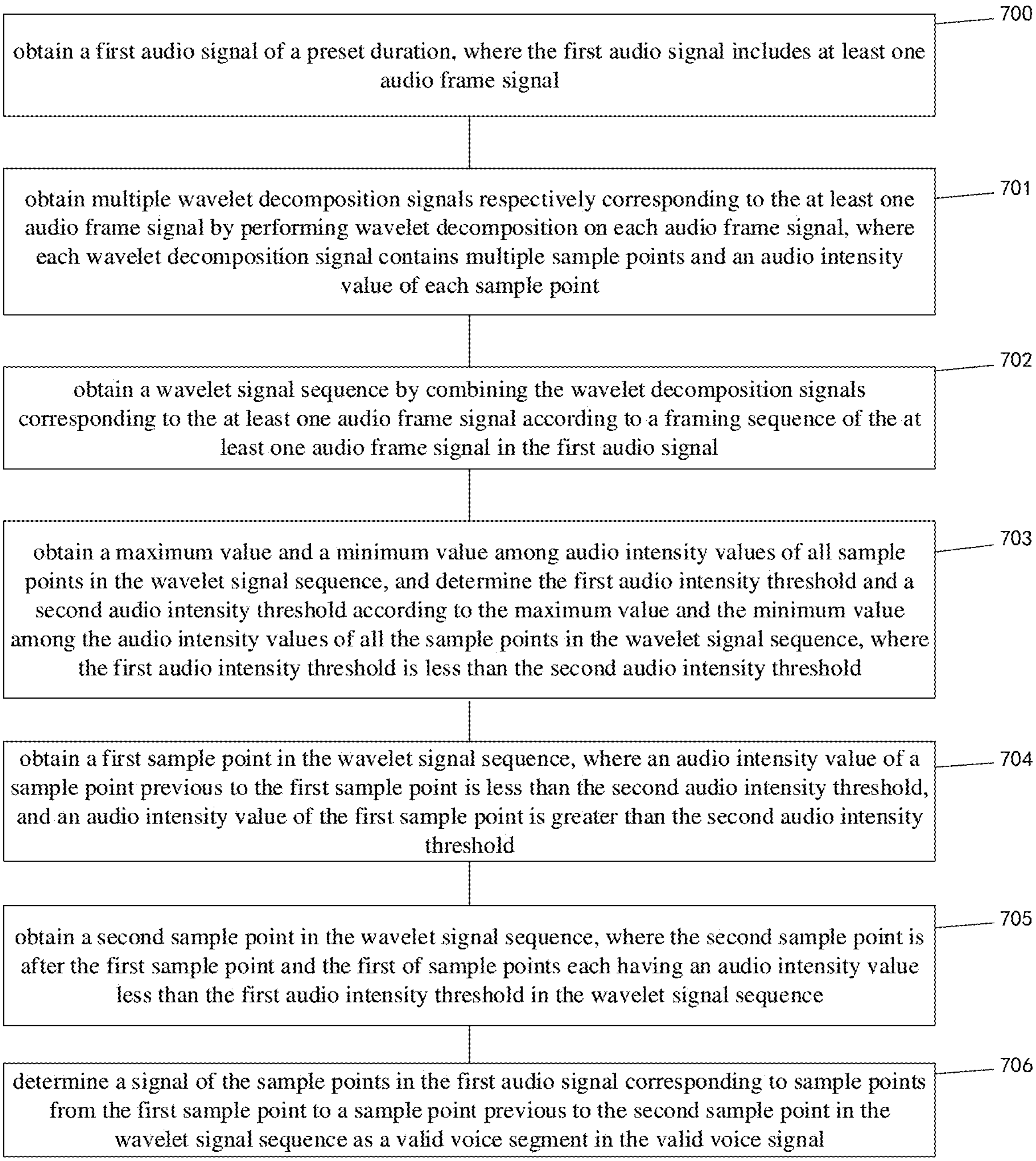
FIG. 7 is a schematic flow chart illustrating another method for detecting a valid voice signal provided in embodiments of the disclosure.
Figure 8:
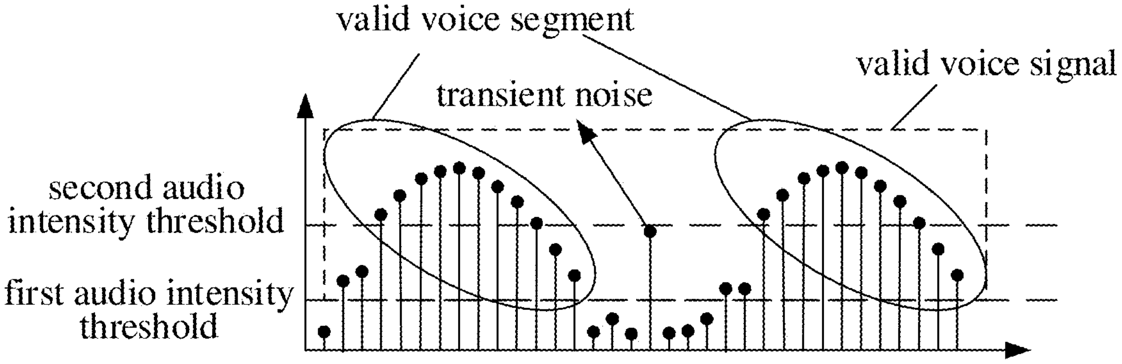
FIG. 8 is a schematic diagram illustrating a voice signal provided in embodiments of the disclosure.
Figure 9:
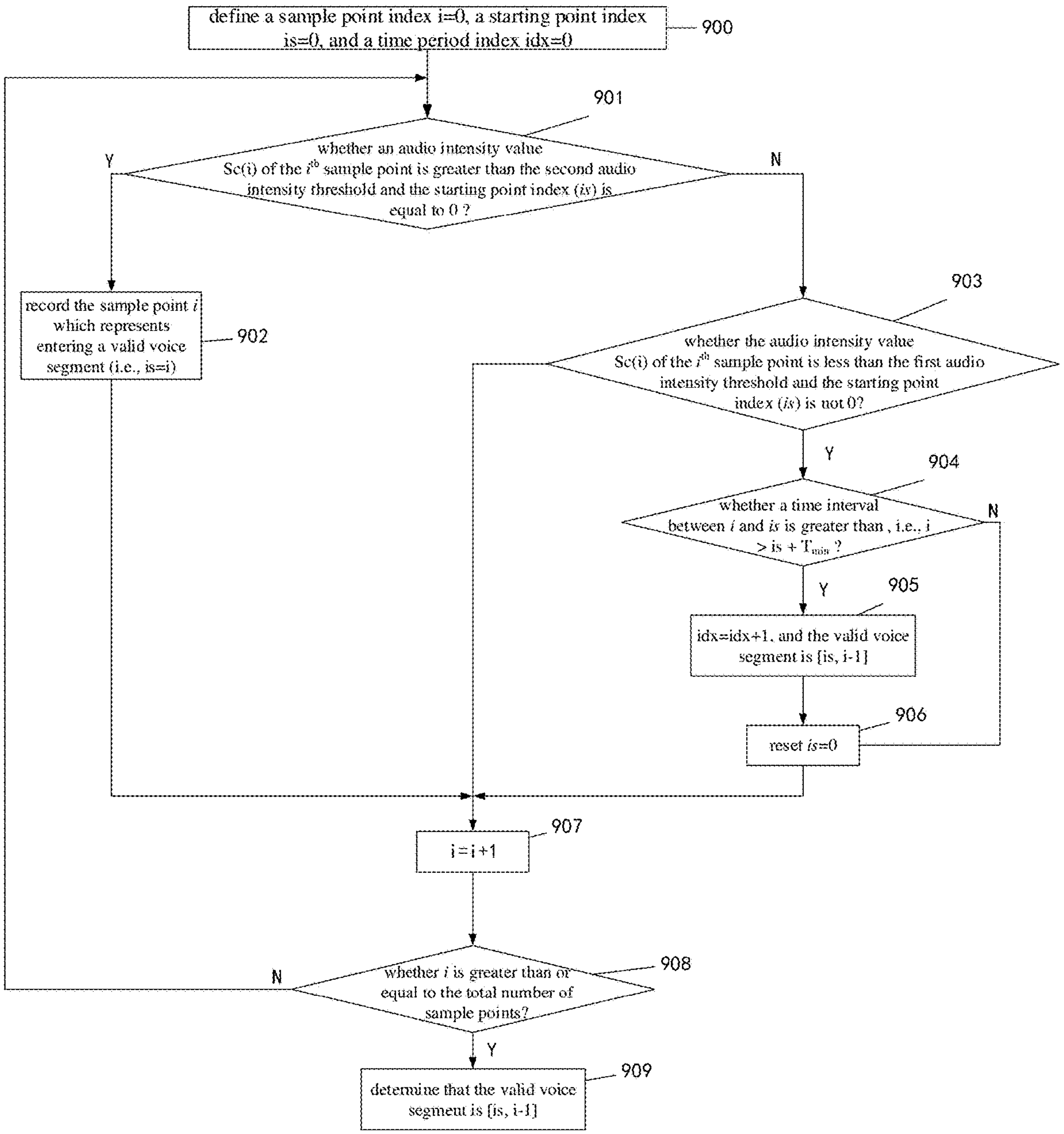
FIG. 9 is a schematic flow chart illustrating yet another method for detecting a valid voice signal provided in embodiments of the disclosure.

The following may describe another method for detecting a valid voice signal provided in the disclosure with reference to FIGS. 7 to 9.

Referring to FIG. 7, FIG. 7 is a schematic flow chart illustrating another method for detecting a valid voice signal provided in embodiments of the disclosure. As illustrated in FIG. 7, specific execution operations of embodiments are as follows.

At 700, a first audio signal of a preset duration is obtained, where the first audio signal includes at least one audio frame signal.

At 701, multiple wavelet decomposition signals respectively corresponding to the at least one audio frame signal are obtained by performing wavelet decomposition on each audio frame signal, where each wavelet decomposition signal contains multiple sample points and an audio intensity value of each sample point.

At 702, a wavelet signal sequence is obtained by combining the wavelet decomposition signals corresponding to the at least one audio frame signal according to a framing sequence of the at least one audio frame signal in the first audio signal.

It can be understood that operations at 700, 701, and 702 correspond to performing framing on the first audio signal and obtaining the wavelet signal sequence by combining signals obtained after wavelet decomposition. For specific implementations, reference may be made to embodiments described above in conjunction with FIGS. 1 to 6, which are not described herein.

At 703, a maximum value and a minimum value among audio intensity values of all sample points in the wavelet signal sequence are obtained, and a first audio intensity threshold and a second audio intensity threshold are determined according to the maximum value and the minimum value among the audio intensity values of all the sample points in the wavelet signal sequence, where the first audio intensity threshold is less than the second audio intensity threshold. Specifically, the first audio intensity threshold and the second audio intensity threshold are determined according to the maximum value and the minimum value among the audio intensity values of all the sample points in the wavelet signal sequence. Optionally, the first audio intensity threshold $T_L$ is determined according to $T_L=\min(\lambda_1\cdot(Sc_{max}-Sc_{min})+Sc_{min}, \lambda_2\cdot Sc_{min})$ and the maximum value and the minimum value among the audio intensity values of all the sample points in the wavelet signal sequence. $Sc_{max}$ represents the maximum value among the audio intensity values of all the sample points in the wavelet signal sequence, $Sc_{min}$ represents the minimum value among the audio intensity values of all the sample points in the wavelet signal sequence, $\lambda_1$ represents a second preset threshold, and $\lambda_2$ represents a third preset threshold. The second audio intensity threshold $T_U$ is determined according to $T_U=\alpha T_L$, where $\alpha$ represents a fourth preset threshold and is greater than 1.

In some possible embodiments, the maximum value and the minimum value among the audio intensity values of all the sample points in the wavelet signal sequence are obtained as follows. A value obtained by processing a reference maximum value of each of all the wavelet decomposition signals in the wavelet signal sequence is determined as the maximum value among the audio intensity values of all the sample points in the wavelet signal sequence, and a value obtained by processing a reference minimum value of each of all the wavelet decomposition signals in the wavelet signal sequence is determined as the minimum value among the audio intensity values of all the sample points in the wavelet signal sequence. For each wavelet decomposition signal, the reference maximum value of the wavelet decomposition signal is obtained according to a maximum value among audio intensity values of all sample points of the wavelet decomposition signal, and the reference minimum value of the wavelet decomposition signal is obtained according to a minimum value among audio intensity values of all sample points of the wavelet decomposition signal. Specifically, the wavelet signal sequence includes multiple wavelet decomposition signals, and a maximum value and a minimum value of all sample points of each wavelet decomposition signal are obtained. Optionally, an average value of the maximum values in all the wavelet decomposition signals is determined as the maximum value among the audio intensity values of all the sample points in the wavelet signal sequence. An average value of the minimum values in all the wavelet decomposition signals is determined as the minimum value among the audio intensity values of all the sample points in the wavelet signal sequence. According to the embodiments, the maximum value and the minimum value in the wavelet signal sequence are optimized, such that the sample points in the wavelet signal sequence can be further analyzed to optimize detection effect of the valid voice signal.

At 704, a first sample point in the wavelet signal sequence is obtained, where an audio intensity value of a sample point previous to the first sample point is less than the second audio intensity threshold, and an audio intensity value of the first sample point is greater than the second audio intensity threshold. Specifically, when the audio intensity value of the first sample point in the wavelet signal sequence is greater than the second audio intensity threshold, and the audio intensity value of the sample point previous to the first sample point is less than the second audio intensity threshold, the first sample point may be deemed as a starting point of the valid voice signal, that is, it is predefined to enter a valid voice segment from the first sample point.

At 705, a second sample point in the wavelet signal sequence is obtained, where the second sample point is after the first sample point and is the first of sample points each having an audio intensity value less than the first audio intensity threshold in the wavelet signal sequence. Specifically, the first sample point is predefined as the starting point of the valid voice segment at 704, i.e., entering the valid voice segment from the first sample point. After the first sampling point, when the second sample point is the first of sample points each having the audio intensity value less than the first audio intensity threshold, it can be considered that the second sample point has exited the valid voice segment in which the first sample point is located.

At 706, a signal of the sample points in the first audio signal corresponding to sample points from the first sample point to a sample point previous to the second sample point in the wavelet signal sequence is determined as a valid voice segment in the valid voice signal. Specifically, the second sample point has exited the valid voice segment in which the first sample point is located at 705, and thus it can be determined that the signal of the sample points in the first audio signal corresponding to the sample points from the first sample point to the sample point previous to the second sample point can be determined as the valid voice segment. In addition, at least a first preset number of consecutive sample points are included between the second sample point and the first sample point. If the first sample point and the second sample point are too close, for example, the first preset number is 20 and the number of consecutive sample points between the first sample point and the second sample point is less than the first preset number, it can be considered that the audio intensity value of the first sample point being greater than the second audio intensity threshold is caused by jitter of transient noise rather than by valid voice.

In some possible embodiments, prior to obtaining the first audio signal of the preset duration, the method further includes the following. The first audio signal is obtained by compensating for a high-frequency component in an original audio signal of the preset duration. Specifically, due to loss of high-frequency components in voice signal during lip pronunciation or microphone recording and great loss of the signal during transmission with the increase of a signal rate, to obtain a relatively good signal waveform at a receiving terminal, the loss signal needs to be compensated. In some possible implementations, the original audio signal of the preset duration is pre-emphasized. That is, the first audio signal is processed according to $y(n)=x(n)-ax(n-1)$, where $x(n)$ represents an audio intensity value of a sample point of the original audio signal at time n, $x(n-1)$ represents an audio intensity value of a sample point of the original audio signal at time n−1, a represents a pre-emphasis coefficient (for example, a is greater than 0.9 and less than 1), which can be deemed as the first preset threshold, and $y(n)$ represents a signal subjected to pre-emphasizing. It can be understood that, it can be considered that the pre-emphasizing is to compensate for high-frequency components by passing the first audio signal through a high-pass filter, such that the loss of the high-frequency components caused by lip articulation or microphone recording can be reduced.

The effect of implementing the embodiments is illustrated in FIG. 8, and FIG. 8 is a schematic diagram illustrating a voice signal provided in embodiments of the disclosure. In operations at 104 described above in conjunction with FIG. 1, the valid voice signal is determined according to the first audio intensity threshold. Furthermore, in embodiments, the valid voice segment is determined according to the first audio intensity threshold and the second audio intensity threshold, which can eliminate transient noise illustrated in FIG. 8 from the valid voice signal, thereby avoiding regarding the transient noise as the valid voice signal and further improving the accuracy of detection of the valid signal.

Specific implementations of embodiments are described in detail with reference to the accompanying drawings. Referring to FIG. 9, FIG. 9 is a schematic flow chart illustrating yet another method for detecting a valid voice signal provided in embodiments of the disclosure. As illustrated in FIG. 9, specific execution operations are as follows.

At 900, a device for detecting a valid signal initially defines a sample point index i=0, a valid voice signal starting point index is=0, and a valid voice signal time period index idx=0. Specifically, the sample point index i is an independent variable, which represents an $i^{th}$ sample point. The starting point index (is) is a recording variable, which records a starting sample point of the valid signal segment. To traverse all the sample points in the wavelet signal sequence, the independent variable i may change, and so it is necessary to define the variable is to record a first same point. Optionally, the valid voice signal time period index idx is also a recording variable, which records a $(idx)^{th}$ valid voice segment. idx may be defined to record the number of valid voice segments included in the first audio signal.

At 901, whether an audio intensity value Sc(i) of the $i^{th}$ sample point is greater than the second audio intensity threshold and the starting point index (is) is equal to 0 are determined. Specifically, the second audio intensity threshold can be considered as an upper limit threshold of the valid voice signal, and the audio intensity value of the sample point is compared with the second audio intensity threshold.

At 902, the sample point i which represents entering a valid voice segment is recorded (i.e., is=i). Specifically, when the audio intensity value Sc(i) of the $i^{th}$ sample point is greater than the second audio intensity threshold and the starting point index (is) is equal to 0 as initially defined, a sample point position of the $i^{th}$ sample point determined at 901 is recorded by is, and it is predefined to enter the valid voice segment from the $i^{th}$ sample point. Thereafter, an audio intensity value of a next sample point is compared. That is, proceed to operations at 907 (i=i+1). In other words, the next sample point is taken as a present sample point, to continue detection and determination. It can be understood that the audio intensity value of the sample point previous to the $i^{th}$ sample point is less than the second audio intensity threshold and the audio intensity value of the $i^{th}$ sample point is greater than the second audio intensity threshold. A first sample point in the wavelet signal sequence is obtained according to operations at 704 of embodiments described above in conjunction with FIG. 7, where the audio intensity value of the sample point previous to the first sample point is less than the second audio intensity threshold and the audio intensity value of the first sample point is greater than the second audio intensity threshold. In this case, the $i^{th}$ sample point is the first sample point, i.e., is records the first sample point, and then proceed to operations at 907 (i=i+1). If the audio intensity value Sc(i) of the $i^{th}$ sample point is not greater than the second audio intensity threshold, proceed to operations at 903.

At 903, whether the audio intensity value Sc(i) of the $i^{th}$ sample point is less than the second audio intensity threshold and the starting point index (is) is not 0 are determined. Specifically, if the audio intensity value Sc(i) of the $i^{th}$ sample point is less than or equal to the second audio intensity threshold or the starting point index (is) is not 0, the audio intensity value Sc(i) of the $i^{th}$ sample point is compared with the first audio intensity threshold, to obtain a second sample point in the wavelet signal sequence according to operations at 705 of embodiments described above in conjunction with FIG. 7. The second sample point is after the first sample point and is the first of sample points each having an audio intensity value less than the first audio intensity threshold in the wavelet signal sequence. To ensure that the second sample point is after the first sample point, it is further necessary to determine the starting point index (is). If the starting point index (is) is not 0, it means that the first sample point has been appeared and determined. When in the wavelet signal sequence a sample point having an audio intensity value less than the first audio intensity threshold first appears, the sample point can be determined as the second sample point. It can be understood that the second sample point has exited the valid voice segment in which the first sample point is located, i.e., a sample point previous to the second sample point is an end sample point of the valid voice segment. If the audio intensity value Sc(i) of the $i^{th}$ sample point is not less than the first audio intensity threshold, it means that the $i^{th}$ sample point is still in the valid signal segment. Alternatively, if the starting point index (is) is 0, it means that the $i^{th}$ sample point is not located in a predefined valid signal segment. When any of the above two situations occurs, proceed to operations at 907 (i=i+1), that is, the next sample point is taken as the present sample point, to perform detection of another valid voice segment.

Furthermore, a time interval between the starting sample point entering the valid voice signal segment and the end sample point of the valid voice signal may be compared to determine whether at least a first preset number of consecutive sample points are included between the first sample point and the second sample point, which are described as follows.

At 904, whether a time interval between i and is is greater than $T_{min}$, i.e., i>is $+T_{min}$ is determined. Specifically, since a sampling interval can be determined according to a sampling frequency, at least the first preset number of consecutive sample points is included between the first sample point and the second sample point, and the first preset number of consecutive sample points can be represented by a time period $T_{min}$. For example, 16 kHz is taken as an example of the sampling frequency of the first audio frame signal, a frame length of the first audio frame signal is 10 ms, and the first audio frame signal includes 160 sample points. After down-sampling of three-stage wavelet decomposition or three-stage wavelet packet decomposition is performed, an interval between sampling points in the wavelet signal sequence is 0.5 ms. If the first preset number is 20, $T_{min}$ equals 20 multiplied by 0.5 ms, that is, $T_{min}$ equals 10 ms. If at least the first preset number of consecutive sample points are included between the first sample point and the second sample point, i.e., i>is$+T_{min}$, proceed to operations at 905. If the number of sample points between the first sample point and the second sample point is less than the first preset number of consecutive sample points, i is the second sample point, and is is the first sample point determined at 901, $i > is + T_{min}$ is not true, and it can be considered that a $(i-1)^{th}$ sample point previous to the $i^{th}$ sample point is not the end sample point of the valid voice segment. The starting sample point of the valid voice segment recorded by is=i at 902 may be caused by noise jitter. Since energy of transient noise rapidly rises and then rapidly falls, the audio intensity value of the sample point may be greater than the second audio intensity threshold in a short time period, and then may drop below the first audio intensity threshold in a time period less than $T_{min}$, which is inconsistent with the short-term stability of the voice signal. Therefore, the signal segment is discarded, and proceed to operations at 906.

At 905, idx=idx+1, and the valid voice segment is [is, i−1]. Specifically, when at least the first preset number of consecutive sample points are included between the first sample point and the second sample point, i.e., $i > is + T_{min}$, a signal of the sample points in the first audio signal corresponding to sample points from the first sample point to a sample point previous to the second sample point in the wavelet signal sequence is determined as a valid voice segment in the valid voice signal according to operations at 706 in the implementations described above in combination with FIG. 7. An interval of the valid voice segment can be expressed by [is, i−1], where is records the first sample point, i represents the second sample point, and i−1 represents the sample point previous to the second sample point. Optionally, idx=idx+1, which records the number of valid signal segments included in the wavelet signal sequence. Thereafter, proceed to operations at 906.

At 906, reset is=0. Specifically, since the first sample point recorded by is has been recorded in the interval, a value of is can be released, i.e., reset is=0, and proceed to operations at 907 (i=i+1). In other words, a next sample point may be taken as the present sample point to perform detection of another valid voice segment.

At 907, i=i+1. Specifically, continue to traverse sample points in the wavelet signal sequence, i.e., sequentially traverse the sample points by increasing i by one.

At 908, whether i is greater than or equal to the total number of sample points is determined. Specifically, after operations at 907 (i=i+1) is performed, before another valid voice segment is detected, it is necessary to determine a position of the sample point, i.e., determine whether i of the $i^{th}$ sample point is greater than or equal to the total number of sample points in the wavelet signal sequence, because i is kept increasing by one to sequentially traverse subsequent sample points. If i is less than the total number of sample points in the wavelet signal sequence, proceed to comparing the audio intensity value with the second audio intensity threshold or the first audio intensity threshold. If the $i^{th}$ sample point has been traversed to the last of all the sample points, e.g., i is equal to or greater than the total number of sample points, proceed to operations at 909.

At 909, determine that the valid voice segment is [is, i−1], to determine, according to operations at 706 in embodiments described above in conjunction with FIG. 7, the signal of the sample points in the first audio signal corresponding to the sample points from the first sample point to the sample point previous to the second sample point in the wavelet signal sequence as the valid voice segment in the valid voice signal.

In foregoing embodiments described in conjunction with FIG. 1 to FIG. 9, the valid voice signal and the time period of the valid voice signal are determined based on the audio intensity value of the voice signal. Furthermore, the voice signal may be tracked, where the audio intensity value of the signal may be affected by a tracking result, such that the accuracy of detection of the valid voice signal can be further improved. The following describes tracking of voice signals in detail with reference to the accompanying drawings, referring to FIG. 10 to FIG. 12.

Figure 10:
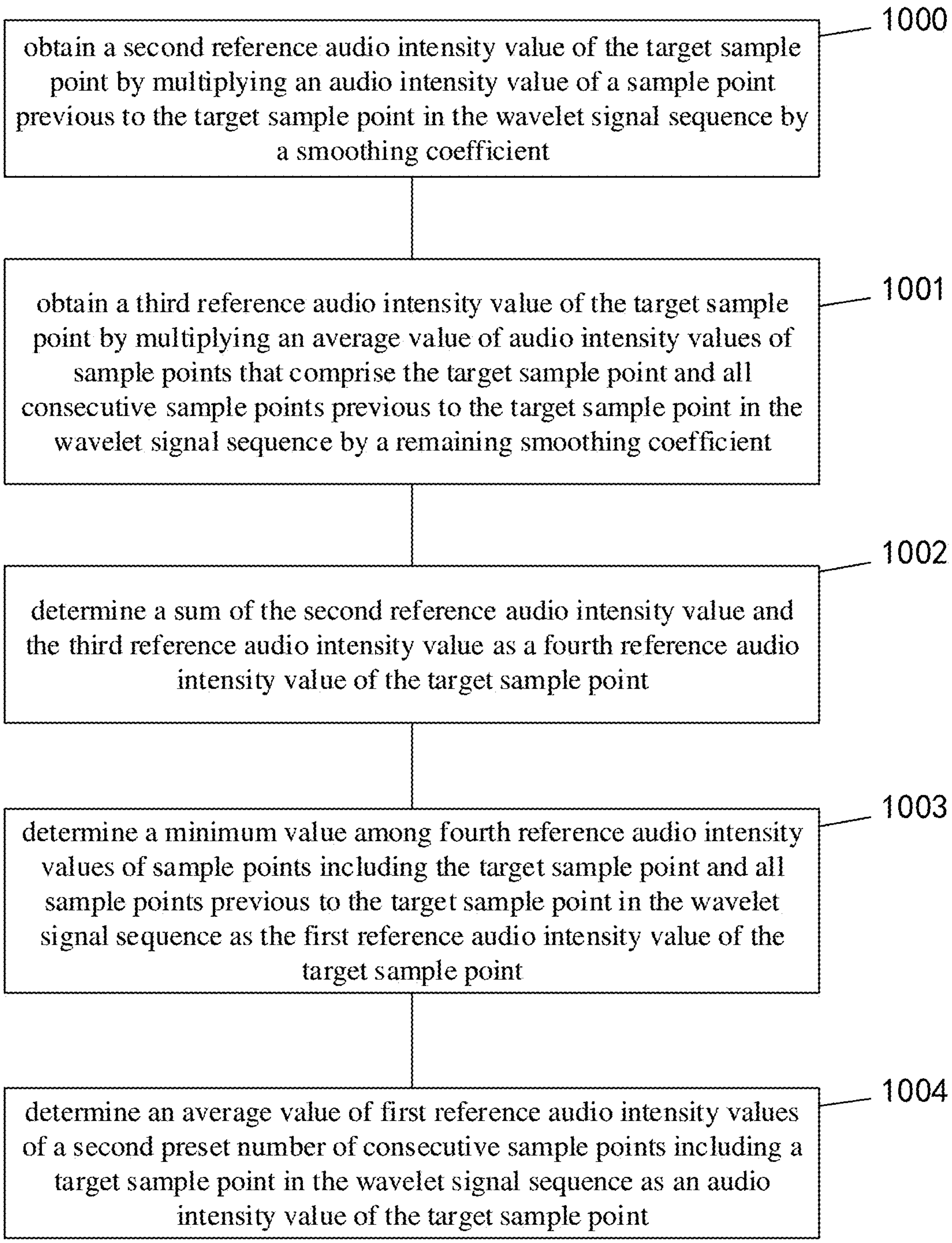
FIG. 10 is a schematic flow chart illustrating tracking of voice signals provided in embodiments of the disclosure.

Referring to FIG. 10, FIG. 10 is a schematic flow chart illustrating tracking of voice signals provided in embodiments of the disclosure. As illustrated in FIG. 10, specific tracking operations are as follows.

At 1000, a second reference audio intensity value of a target sample point is obtained by multiplying an audio intensity value of a sample point previous to the target sample point in the wavelet signal sequence by a smoothing coefficient. Specifically, time-domain amplitude smoothing is performed on the sample points in the wavelet signal sequence, to enable a smooth transition between adjacent sample points in the voice signal, thereby reducing the influence of the burr on the voice signal. In one example, if S(i) represents the audio intensity value of the target sample point, S(i−1) represents the audio intensity value of the sample point previous to the target sample point, and $\alpha_s$ represents the smoothing coefficient, the audio intensity value S(i−1) of the sample point previous to the target sample point in the wavelet signal sequence is multiplied by the smoothing coefficient $\alpha_s$ to obtain the second reference audio intensity value of the target sample point. The second reference audio intensity value of the target sample point may be expressed by $\alpha_s \times S(i-1)$.

At 1001, a third reference audio intensity value of the target sample point is obtained by multiplying an average value of audio intensity values of sample points that include the target sample point and all consecutive sample points previous to the target sample point in the wavelet signal sequence by a remaining smoothing coefficient. Specifically, the second reference audio intensity value is determined as a part of a time-domain smoothing result. A value obtained by multiplying the average value of the audio intensity values of the sample points that include the target sample point and all the consecutive sample points previous to the target sample point in the wavelet signal sequence by the remaining smoothing coefficient is determined as the other part of the time-domain smoothing result. In one example, take performing three-stage wavelet packet decomposition on the first audio signal as an example for illustration. The wavelet signal sequence includes eight wavelet packet decomposition signals. The average value M(i) of the audio intensity values of all the consecutive sample points previous to the target sample point can be expressed as:

$$M(i) = \frac{1}{8}\sum_{l=1}^{8} x_l(i) \quad \text{formula 1}$$

In formula 1, i represents the $i^{th}$ sample point in the wavelet signal sequence, and l represents a $l^{th}$ wavelet decomposition signal. It can be understood that i is less than the total number of all sample points in the wavelet signal sequence. The third reference audio intensity value of the target sample point is obtained by multiplying the average value M(i) of the audio intensity values of the sample points that include the target sample point and all the consecutive sample points previous to the target sample point in the wavelet signal sequence by the remaining smoothing coefficient $1-\alpha_s$. The third reference audio intensity value can be expressed by $M(i) \times (1-\alpha_s)$.

At 1002, a sum of the second reference audio intensity value and the third reference audio intensity value is determined as a fourth reference audio intensity value of the target sample point. Specifically, according to operations at 1000, it can be obtained that the second reference audio intensity value is $\alpha_s \times S(i-1)$, and according to operations at 1001, it can be obtained that the third reference audio intensity value is $M(i) \times (1-\alpha_s)$. Therefore, the fourth reference audio intensity value $\alpha_s \times S(i-1)+M(i) \times (1-\alpha_s)$ is obtained by adding the second reference audio intensity value and the third reference audio intensity value. In some possible implementations, the fourth reference audio intensity value can represent the audio intensity value of the target sample point after smoothing, and then the fourth reference audio intensity value can be determined as the audio intensity value of the target sample point, which may be expressed by $S(i)=\alpha_s \times S(i-1)+M(i) \times (1-\alpha_s)$.

At 1003, a minimum value among fourth reference audio intensity values of sample points including the target sample point and all sample points previous to the target sample point in the wavelet signal sequence is determined as the first reference audio intensity value of the target sample point. Specifically, a duration of a signal to be tracked may be preset, and the signal of the preset duration is then segmented into tracking signals each having a first preset duration. According to the fourth reference audio intensity values of all the sample points previous to the target sample point in the wavelet signal sequence, a minimum value among fourth reference audio intensity values of all sample points in a first duration is recorded, and is passed to a tracking signal of a next preset duration. That is, the minimum value of all the sample points in the previous preset duration is compared with an audio intensity value of a first sample point in a present preset duration and then the smaller of the two values is recorded. Thereafter, the smaller of the two values is compared with an audio intensity value of a subsequent sample point in the present preset duration. In above manners, the smaller of the two values is recorded each time and is then compared with an audio intensity value of a subsequent sample point. Therefore a minimum value among fourth reference audio intensity values of all the sample points in the preset duration is obtained, such that a first reference audio intensity value of the target sample point can be determined.

Figure 11A:
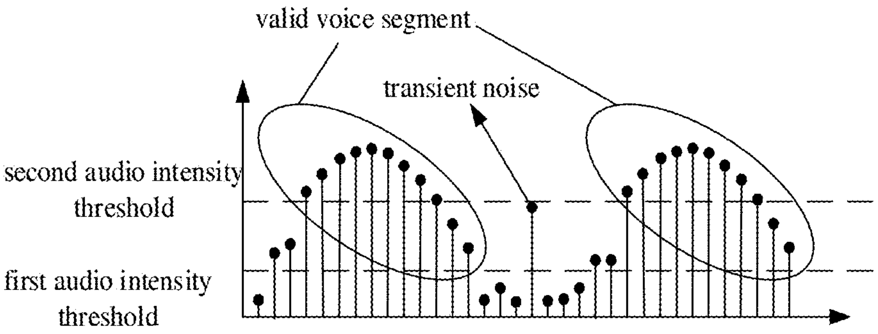
FIG. 11A is a schematic diagram illustrating another voice signal provided in embodiments of the disclosure.
Figure 11B:
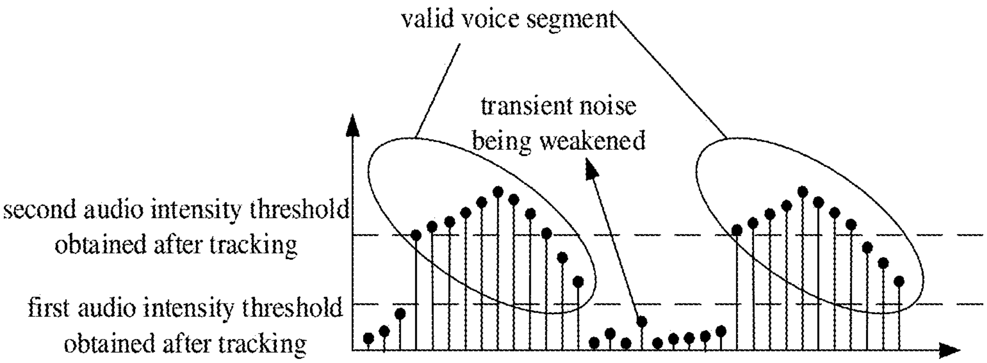
FIG. 11B is a schematic diagram illustrating yet another voice signal provided in embodiments of the disclosure.

By implementing embodiments, all the sample points in the wavelet signal sequence are segmented according to a preset duration, and the distribution of audio intensity of all the sample points in the preset duration is tracked, so that the energy of transient noise can be weakened. The effect of implementing implementations can be illustrated in FIGS. 11A and 11B. FIG. 11A is a schematic diagram illustrating another voice signal provided in embodiments of the disclosure. As illustrated in FIG. 11A, in embodiments described above in conjunction with FIG. 1 to FIG. 9, by performing statistics on all the sample points in the wavelet signal sequence, the accurate first audio intensity threshold and second audio intensity value can be obtained, such that transient noise can be excluded outside the valid voice segment and the effect illustrated in FIG. 11A can be realized. In contrast, the effect obtained by implementing implementations illustrated in FIG. 10 can be illustrated in FIG. 11B. FIG. 11B is a schematic diagram illustrating yet another voice signal provided in embodiments of the disclosure. As illustrated in FIG. 11B, by tracking the distribution of audio intensity of all the sample points in the preset duration, the audio intensity values of the sample points in the wavelet signal sequence may be weakened, and therefore the energy of transient noise is greatly weakened, such that the interference of transient noise to detection of the valid voice signal may be reduced. The valid voice signal is detected according to the first audio intensity threshold and the second audio intensity threshold obtained after tracking, which may improve the accuracy of the detection of the valid voice signal.

The following may describe in detail how to track the voice signal and the effect achieved by tracking the voice signal with reference to the accompanying drawings.

In some possible embodiments, to further reduce the influence of blur that may appear in the wavelet signal sequence, after the first reference audio intensity value of the target sample point is determined, the following can be further conducted.

At 1004, an average value of first reference audio intensity values of a second preset number of consecutive sample points including the target sample point in the wavelet signal sequence is determined as an audio intensity value of the target sample point. Specifically, in the wavelet signal sequence, short-term mean smoothing is performed on the target sample point, and a value obtained after the short-term mean smoothing is determined as the audio intensity value of the target sample point. In some possible implementations, an audio intensity value $S_C(i)$ of a $i^{th}$ sample point is:

$$S_C(i) = \frac{1}{2M+1}\sum_{m=-M}^{M} S_m(i-m) \quad \text{formula 2}$$

In formula 2, 2M represents the second preset number of consecutive sample points, $S_m(i)$ represents the first reference audio intensity value of the target sample point, and $S_m(i-m)$ represents m sample points before or after the $i^{th}$ sample point. In some examples, M=80, i.e., the second preset number of consecutive sample points is 160, and therefore $\Sigma_{m=-M}^{M} S_m(i-m)$ may represent that a sum operation is performed on first reference audio intensity values of 80 sample point before the $i^{th}$ sample point and first reference audio intensity values of 80 sample points after the $i^{th}$ sample point, to obtain a sum of the audio intensity value of each of sample points that include target sample point i, M sample points before target sample point i, and M sample points after target sample point i. Thereafter, a result obtained after the sum operation is averaged. That is, the sum of the audio intensity values is divided by the number of all sample points, and a result obtained after dividing is then determined as the audio intensity value $S_C(i)$ of the $i^{th}$ sample point after amplitude short-term mean smoothing. In the formula 2, m is an independent variable. To avoid negative sample points, i is greater than M. M being equal to 80 is taken as an example, i.e., mean smoothing is performed on sample points starting from a $81^{st}$ sample point.

The device for detecting a valid voice signal tracks the voice signal and uses the tracking result to affect the audio intensity value of the signal, which can be combined with any one of the implementations described above in conjunction with FIG. 1 to FIG. 9 based on the audio intensity value of the sample point.

In some possible embodiments, the device for detecting a valid voice signal obtains a first audio signal of a preset duration, and obtains multiple sample points of each audio frame signal and an audio intensity value of each sample point, where the first audio signal includes at least one audio frame signal.

Multiple wavelet decomposition signals respectively corresponding to the at least one audio frame signal are obtained by performing wavelet decomposition on each audio frame signal, where each wavelet decomposition signal contains multiple sample points and an audio intensity value of each sample point.

A wavelet signal sequence is obtained by combining the wavelet decomposition signals corresponding to the at least one audio frame signal according to a framing sequence of the at least one audio frame signal in the first audio signal.

A second reference audio intensity value of the target sample point is obtained by multiplying an audio intensity value of a sample point previous to the target sample point in the wavelet signal sequence by a smoothing coefficient.

A third reference audio intensity value of the target sample point is obtained by multiplying an average value of audio intensity values of sample points that include the target sample point and all consecutive sample points previous to the target sample point in the wavelet signal sequence by a remaining smoothing coefficient.

A sum of the second reference audio intensity value and the third reference audio intensity value is determined as a fourth reference audio intensity value of the target sample point.

A minimum value among fourth reference audio intensity values of sample points including the target sample point and all sample points previous to the target sample point in the wavelet signal sequence is determined as the first reference audio intensity value of the target sample point.

An average value of first reference audio intensity values of a second preset number of consecutive sample points including a target sample point in the wavelet signal sequence is determined as an audio intensity value of the target sample point.

A maximum value and a minimum value among audio intensity values of all sample points in the wavelet signal sequence are obtained, and a first audio intensity threshold is determined according to the maximum value and the minimum value among the audio intensity values of all the sample points in the wavelet signal sequence.

Sample points each having an audio intensity value greater than the first audio intensity threshold in the wavelet signal sequence are obtained, and a signal of sample points in the first audio signal corresponding to the sample points each having an audio intensity value greater than the first audio intensity threshold in the wavelet signal sequence is determined as the valid voice signal.

For specific implementations of embodiments, reference may be made to the embodiments described above with reference to FIG. 1 to FIG. 10, which is not repeated herein. Compared to the effects of the embodiments described above with reference to FIGS. 1 to 9, in embodiments, the accuracy of detection of the valid signal can be further improved, which will be described in detail below with reference to the accompanying drawings. According to embodiments, by means of the excellent local microscopic characteristics of wavelet decomposition, the energy distribution information of the stable duration in the wavelet signal sequence may be tracked, and the upper limit of the audio intensity threshold is determined based on the tracked energy distribution information, thereby realizing the detection of the valid voice signal.

In other possible embodiments, a device for detecting a valid voice signal obtains a first audio signal of a preset duration, where the first audio signal includes at least one audio frame signal.

Multiple wavelet decomposition signals respectively corresponding to the at least one audio frame signal are obtained by performing wavelet decomposition on each audio frame signal, where each wavelet decomposition signal contains multiple sample points and an audio intensity value of each sample point.

A wavelet signal sequence is obtained by combining the wavelet decomposition signals corresponding to the at least one audio frame signal according to a framing sequence of the at least one audio frame signal in the first audio signal.

A second reference audio intensity value of the target sample point is obtained by multiplying an audio intensity value of a sample point previous to the target sample point in the wavelet signal sequence by a smoothing coefficient.

A third reference audio intensity value of the target sample point is obtained by multiplying an average value of audio intensity values of sample points that include the target sample point and all consecutive sample points previous to the target sample point in the wavelet signal sequence by a remaining smoothing coefficient.

A sum of the second reference audio intensity value and the third reference audio intensity value is determined as a fourth reference audio intensity value of the target sample point.

A minimum value among fourth reference audio intensity values of sample points including the target sample point and all sample points previous to the target sample point in the wavelet signal sequence is determined as the first reference audio intensity value of the target sample point.

An average value of first reference audio intensity values of a second preset number of consecutive sample points including a target sample point in the wavelet signal sequence is determined as an audio intensity value of the target sample point.

A maximum value and a minimum value among audio intensity values of all sample points in the wavelet signal sequence are obtained, and the first audio intensity threshold and a second audio intensity threshold are determined according to the maximum value and the minimum value among the audio intensity values of all the sample points in the wavelet signal sequence, where the first audio intensity threshold is less than the second audio intensity threshold.

A first sample point in the wavelet signal sequence is obtained, where an audio intensity value of a sample point previous to the first sample point is less than the second audio intensity threshold, and an audio intensity value of the first sample point is greater than the second audio intensity threshold.

A second sample point in the wavelet signal sequence is obtained, where the second sample point is after the first sample point and is the first of sample points each having an audio intensity value less than the first audio intensity threshold in the wavelet signal sequence.

A signal of the sample points in the first audio signal corresponding to sample points from the first sample point to a sample point previous to the second sample point in the wavelet signal sequence is determined as a valid voice segment in the valid voice signal. Optionally, at least a first preset number of consecutive sample points are included between the second sample point and the first sample point.

For specific implementations of embodiments, reference may be made to the embodiments described above with reference to FIG. 1 to FIG. 10, which is not repeated herein. Compared to the effects of the embodiments described above with reference to FIGS. 1 to 9, in embodiments, the accuracy of detection of the valid signal can be further improved, which will be described in detail below with reference to the accompanying drawings. According to embodiments, by means of the excellent local microscopic characteristics of wavelet decomposition, the energy distribution information of the stable duration in the wavelet signal sequence is tracked, and the upper limit and the lower limit of the audio intensity threshold is determined based on the tracked energy distribution information, thereby realizing the detection of the valid voice segment of the valid voice signals.

In some possible implementations, a value obtained by processing a reference maximum value of each of all the wavelet decomposition signals in the wavelet signal sequence is determined as the maximum value among the audio intensity values of all the sample points in the wavelet signal sequence, and a value obtained by processing a reference minimum value of each of all the wavelet decomposition signals in the wavelet signal sequence is determined as the minimum value among the audio intensity values of all the sample points in the wavelet signal sequence. For each wavelet decomposition signal, the reference maximum value of the wavelet decomposition signal is obtained according to a maximum value among audio intensity values of all sample points of the wavelet decomposition signal, and the reference minimum value of the wavelet decomposition signal is obtained according to a minimum value among audio intensity values of all sample points of the wavelet decomposition signal.

In some possible implementations, the first audio signal is obtained by compensating for a high-frequency component in an original audio signal of the preset duration.

It can be understood that the wavelet decomposition is performed on each audio frame signal as follows. Wavelet packet decomposition is performed on each audio frame signal, and each signal obtained after the wavelet packet decomposition is determined as the wavelet decomposition signal.

Figure 12:
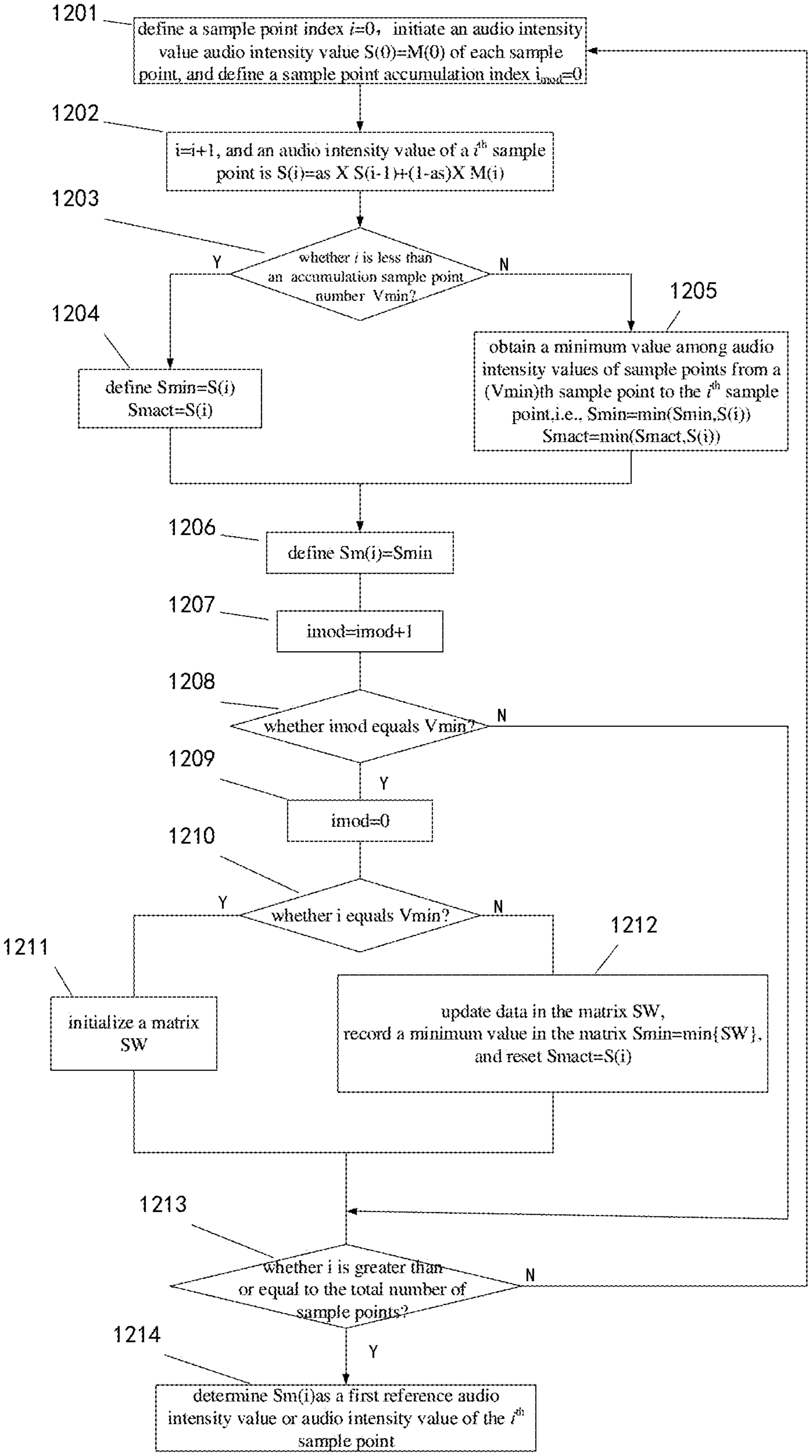
FIG. 12 is another schematic flow chart illustrating tracking of voice signals provided in embodiments of the disclosure.

An exemplary illustration of how to track the voice signal will be given below with reference to the accompanying drawings. Referring to FIG. 12, FIG. 12 is another schematic flow chart illustrating tracking of voice signals provided in embodiments of the disclosure. As illustrated in FIG. 12, specific execution operations are as follows.

At 1201, a device for detecting a valid voice signal initially defines a sample point index i=0 of the wavelet signal sequence, initiates an audio intensity value S(0)=M(0), and defines a sample point accumulation index $i_{mod}=0$. Specifically, i=0, S(0)=M(0), and $i_{mod}=0$ can be deemed as an initiation state of the device for detecting a valid voice signal. The number of sample points to be traversed and an audio intensity value of each sample point are initially defined, and the sample point accumulation index is used for controlling the preset duration. When a value of the sample point accumulation index $i_{mod}$ reaches a fixed value (i.e., $V_{win}$), data updating is conducted to complete tracking of a signal of the preset duration.

At 1202, i=i+1 and an audio intensity value of a $i^{th}$ sample point is $S(i)=\alpha_s\times S(i-1)+M(i)\times(1-\alpha_s)$. Specifically, start to perform tracking of the audio intensity value of the sample point (which can also be understood as tracking of the energy distribution). i=i+1 represents performing amplitude smoothing on each traversed sample point, and the audio intensity value of the $i^{th}$ sample point after smoothing is $S(i)=\alpha_s\times S(i-1)+M(i)\times(1-\alpha_s)$. Therefore, operations at 1000, 1001 and 1002 in embodiments described above in conjunction with FIG. 10 can be implemented. The fourth reference audio intensity value is $S(i)=\alpha_s\times S(i-1)+M(i)\times(1-\alpha_s)$. Optionally, $\alpha_s=0.7$.

At 1203, whether i is less than an accumulation sample point number $V_{win}$ is determined. Specifically, in embodiments, tracking is performed on the voice signal of a time period, so sample points need to be accumulated. The accumulation sample point number $V_{win}$ is pre-defined, and optionally $V_{win}=10$. When sample points from 0 to a ninth sample point are traversed, operations at 1204 are performed, and when a tenth sample point is traversed, operations at 1205 are performed.

At 1204, if i is less than the accumulation sample point number $V_{win}$, define $S_{min}=S(i)$ and $S_{mact}=S(i)$. Specifically, traversing is conducted from a first sample point in the wavelet signal sequence to perform smoothing on the audio intensity of the sample point. When i is less than accumulation sample point number $V_{win}$, a value of S(i) is assigned to $S_{min}$ and $S_{mact}$, i.e., $S_{min}=S(i)$, and $S_{mact}=S(i)$. Proceed to operations at 1206 to record data of $S_{min}$ and proceed to operations at 1207 to perform sample point accumulation. In one example, i=i+1 can be understood that the device for detecting a valid voice signal keeps tracking audio intensity values of the sample points. i being less than the accumulation number $V_{win}$ includes a case where first $V_{win}$ sample points of the first audio signal are traversed. For example, $V_{win}=10$, when a ninth sample point is traversed, $S_{min}=S(9)$, and $S_{mact}=S(9)$, that is, $S_{min}$ and $S_{mact}$ record the audio intensity value of the ninth sample point.

At 1205, if i is greater than or equal to the accumulation sample point number $V_{win}$, obtain a minimum value among audio intensity values of sample points from a $(V_{win})^{th}$ sample point to the $i^{th}$ sample point, i.e., $S_{min}=\min(S_{min}, S(i))$ and $S_{mact}=\min(S_{mact}, S(i))$. Specifically, if i is greater than or equal to the accumulation sample point number $V_{win}$, when the $(V_{win})^{th}$ sample point is traversed, $V_{win}=10$ is taken as an example for illustration, i.e., when the tenth sample point is traversed at 1203, a smaller value between an audio intensity value of the ninth sample point and an audio intensity value of the tenth sample point is assigned to $S_{min}$, i.e., $S_{min}=\min(S_{min}, S(10))$. In other words, $S_{min}$ records a value of S(9) in a step before traversing to the tenth sample point.

At 1206, define $S_m(i)=S_{min}$. Specifically, operations at 1203 in embodiments described above in conjunction with FIG. 10 is implemented, that is, a minimum value among fourth reference audio intensity values of sample points including the target sample point and all sample points previous to the target sample point in the wavelet signal sequence is determined as the first reference audio intensity value of the target sample point. It can be understood that when i is less than the accumulation sample point number $V_{win}$, $S_m(i)$ does not record a smaller value between audio intensity values of adjacent sample points. It can be understood that when several sample points at the beginning of the voice are traversed, some initialization need to be conducted, for example, matrix SW is initialized, so a part of signal at the beginning of the voice may be ignored. $V_{win}=10$ for example, and $S_m(i)$ records the minimum value among the audio intensity values which is obtained starting from the ninth sample point.

At 1207, $i_{mod}=i_{mod}+1$. Specifically, during traversing of sample point i, sample point accumulation index $i_{mod}$ is also continuously accumulated, i.e., $i_{mod}=i_{mod}+1$, where $i_{mod}$ is used for controlling whether to perform data updating on matrix SW. The wavelet signal sequence is segmented into voice signals each having a preset duration for tracking. It can be understood that i represents a position of each of the sample points and a sequence of the sample points in the wavelet signal sequence, and $i_{mod}$ represents a position and a sequence of the $i^{th}$ sample point in the preset duration. When the preset duration arrives, $i_{mod}$ may be reset and restart to record a position of each of sample points of a next voice signal in the next preset duration.

At 1208, whether $i_{mod}$ is equal to $V_{min}$ is determined. Specifically, $i_{mod}$ and $V_{min}$ are compared to determine whether tracking for the sample points has reached the preset duration. In one example, if perform three-stage wavelet packet decomposition and down-sampling with 16 KHz as a sampling frequency of the first audio signal, sampling is performed every 0.5 ms in the wavelet signal sequence, the accumulation sample point number $V_{min}$=10, and thus a tracking duration is $V_{win}$×0.5=5 ms. If $i_{mod}$ is equal to $V_{min}$, it means that the preset tracking duration is reached, and proceed to operations at 1209. Otherwise, if $i_{mod}$ is not equal to $V_{min}$, optionally, if $i_{mod}$ is less than $V_{min}$, proceed to operations at 1213.

At 1209, $i_{mod}$=0. Specifically, each time $i_{mod}$ reaches the accumulation sample point number $V_{min}$, $i_{mod}$ is released and is then reset (e. g., $i_{mod}$=0) to perform a next sample point accumulation.

At 1210, whether i is equal to $V_{min}$ is determined. Specifically, when i is equal to $V_{min}$, proceed to operations at 1211 to initialize matrix data. When i is not equal to $V_{min}$, proceed to operations at 1212.

At 1211, a matrix SW is initialized. Specifically, define SW:

$$SW = \begin{bmatrix} S(V_{min}) \\ \cdots \\ S(V_{min}) \\ S(V_{min}) \end{bmatrix}_{N_{win}\times 1} \quad \text{formula 3}$$

When i is equal to $V_{min}$, define a matrix SW with $N_{win}$ rows and one column. Optionally, $N_{win}$=2. It can be understood that the operation is performed at the beginning of a voice, i is increased all the time, and $V_{min}$ is a preset fixed value. When the $(V_{min})^{th}$ sample point is traversed by i, the matrix SW is initialized, to provide a matrix to store data in embodiments.

At 1212, data in the matrix SW is updated, a minimum value in the matrix is recorded by $S_{min}$=min{SW}, and $S_{mact}$ is reset (e.g., $S_{mact}$=S(i)). Specifically, SW is:

$$SW = \begin{bmatrix} S_m(i-(N_{win}-1)\times V_{min}) \\ \cdots \\ S_m(i-2V_{min}) \\ S_m(i-V_{min}) \\ S_{mact} \end{bmatrix}_{N_{win}\times 1} \quad \text{formula 4}$$

When i is not equal to $V_{min}$, and accumulation index $i_{mod}$ indicates that the preset duration is reached, values in the matrix SW is updated. A minimum value among audio intensity values of all the sample points in a present time period and a minimum value in a previous time period are stored in the matrix SW, and then the smaller of the two values is obtained and recorded by $S_{min}$, i.e., $S_{min}$=min {SW}. It can be understood that $S_{min}$ records a minimum value among audio intensity values of all sample points starting from a sample point previous to a $(V_{min})^{th}$ sample point. $S_{mact}$ is released and is then reset, e.g., $S_{mact}$=S(i). In one example, a tracking duration of 5 ms is taken as an example for illustration, $S_{mact}$ records a minimum value among fourth reference audio intensity values of all sample points in a latest 5 ms, and $S_{min}$ records a minimum value among fourth reference audio intensity values of all sample points in a previous 5 ms. Thereafter, minimum values in two adjacent 5 ms are stored in the matrix SW of length 2, and then the smaller of the two values is obtained and is recorded by $S_{min}$, i.e., $S_{min}$=min {SW}. $S_{min}$ that records the minimum value in the tracking duration is assigned to $S_m$(i) at 1206, i.e., $S_m$(i)=$S_{min}$.

At 1213, whether i is greater than or equal to the total number of sample points is determined. Specifically, it can be understood that after operations at 1202 (i=i+1) is performed, before another signal of the preset time period is tracked, it is necessary to determine a position of the sample point in the wavelet signal sequence, i.e., determine whether i of the $i^{th}$ sample point is greater than or equal to the total number of sample points in the wavelet signal sequence because i is kept increasing by one to sequentially traverse subsequent sample points. If i is less than the total number of sample points in the wavelet signal sequence, proceed to signal tracking. If the last of all the sample points is traversed by i, e.g., i is equal to or greater than the total number of sample points, proceed to operations at 1214.

At 1214, $S_m$(i) is determined as a first reference audio intensity value or audio intensity value of the $i^{th}$ sample point. Specifically, it can be obtained from steps 1212 and 1206 that $S_m$(i) records the minimum value among audio intensity values of all sample points starting from a sample point previous to a $(V_{min})^{th}$ sample point. In some possible implementations, $S_m$(i) is the first reference audio intensity value of the $i^{th}$ sample point, such that implementations described at 1003 of embodiments described above in conjunction with FIG. 10 are achieved, i.e., a first reference audio intensity value of a target sample point is obtained, so as to obtain an audio intensity value of the target sample point.

In embodiments, the minimum value $S_{min}$ among the audio intensity values of all the sample points in a previous tracking duration is passed to the present tracking duration by means of the matrix, and then $S_{min}$ is compared with the audio intensity value of the target sample point. The minimum value among the fourth reference audio intensity values of the sample points including the target sample point and all the sample points previous to the target sample point in the wavelet signal sequence is obtained, that is, $S_{min}$=min ($S_{min}$, S(i)), which is then determined as the first reference audio intensity value $S_m$(i) of the target sample point. Thereafter, the smaller of the two values (i.e., $S_{min}$ and the audio intensity value of the target sample point) is compared with a fourth reference audio intensity value of a sample point subsequent to the target sample point to obtain a smallest value among the three values, and then the smallest value is determined as a first reference audio intensity value $S_m$(i+1) of a sample point subsequent to the target sample point. In above manners, the minimum value among the audio intensity values of all the sample points in the tracking duration is obtained, and a smaller value between the minimum value among audio intensity values in the previous tracking duration and a minimum value among audio intensity values in the present tracking duration is passed to a next tracking duration by means of the matrix. The sample point sequence formed by $S_m$(i) can describe the distribution of the audio intensity values of the voice signal, which can also be understood as the energy distribution trend of the voice signal.

By implementing embodiments, by tracking the audio intensity values of the signal of the stable duration, the accuracy of detection of the valid voice signal can be further improved, such that the false detection that transient noise is determined as a valid voice signal or valid voice signal segment can be further avoided.

Figure 13A:
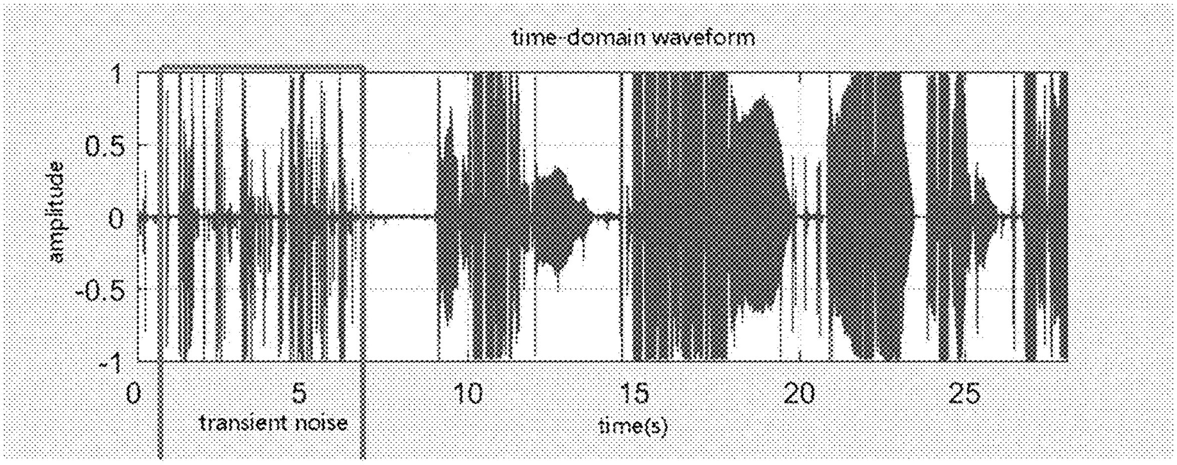
FIGS. 13A to 13E are schematic diagrams each illustrating a detection effect of a valid voice signal provided in embodiments of the disclosure.

The effect of implementing embodiments can be exemplarily described below with reference to the accompanying drawings. Referring to FIGS. 13A to 13E, FIGS. 13A to 13E are schematic diagrams each illustrating a detection effect of a valid voice signal provided in embodiments of the disclosure. The device for detecting a valid voice signal obtains a piece of original voice signal including transient noise. The original waveform of the voice signal is illustrated in FIG. 13A, and it can be seen that the transient noise is distributed in a time period of 0 to 6 s.

Figure 13B:
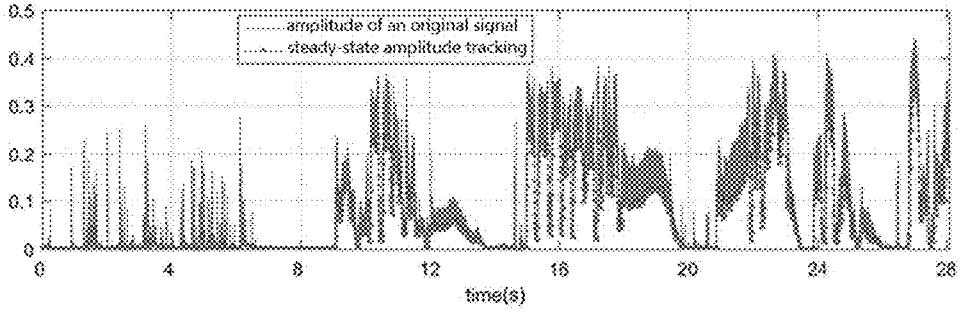

After the device for detecting the valid signal performs the wavelet decomposition or wavelet packet decomposition described above in conjunction with FIG. 1 to FIG. 9 on the original voice signal, the audio intensity values of all the sample points of the wavelet signal sequence of the original signal are obtained. Furthermore, by means of the voice signal tracking described above in conjunction with FIG. 10 and FIG. 12, steady-state amplitude tracking after the voice signal tracking is obtained. The sample energy distributions obtained through the two manners are illustrated in FIG. 13B. It can be understood that according to FIG. 10, since the minimum value among the reference audio intensity values of the sample points including the target sample point and all the sample points previous to the target sample point in the wavelet signal sequence is determined as the reference audio intensity value of the target sample point, the amplitude value of the voice signal after steady-state amplitude tracking is weakened relative to the amplitude value of the wavelet signal sequence of the original signal, the weakened amplitude value corresponds to a part of signal corresponding to the transient noise, and an amplitude value corresponding to the voice signal has almost no change.

Figure 13C:
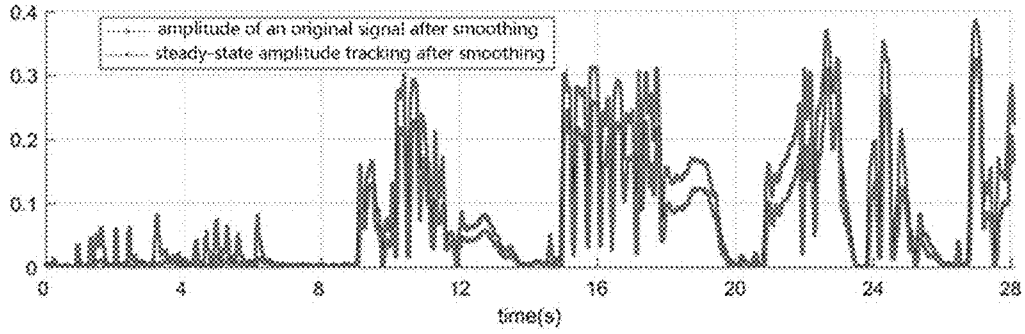

To further reduce the influence of signal burr, the original signal amplitude and the audio intensity values of all the sample points after the steady-state amplitude tracking are smoothed, and the smoothed result is illustrated in FIG. 13C. In some possible implementations, for a manner in which the smoothing is performed on the audio intensity value of the sample point, reference may be made to foregoing embodiments in combination with FIG. 10 and formula 2. In combination with FIGS. 13B and 13C, it can be seen that after the above-mentioned short-term mean smoothing of the audio intensity values of the sample points in embodiments in combination with FIG. 10 is implemented, the signal burr can be significantly reduced, which may make the signal smoother as a whole.

Figure 13D:
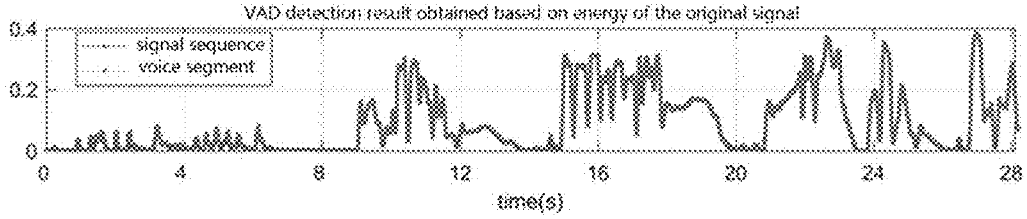
Figure 13E:
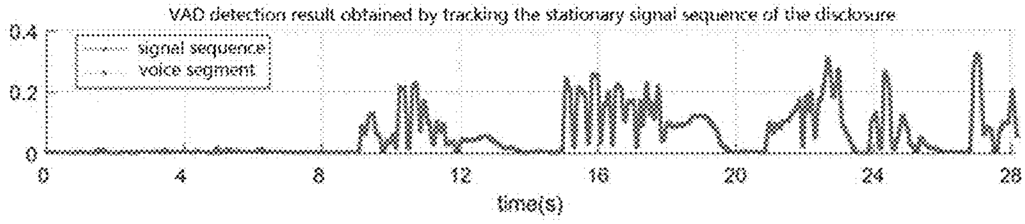

The detection of the valid voice signal, that is, voice activity detection (VAD), is performed on the signal in FIG. 13C. In the disclosure, detection of the valid voice signal is conducted. The result of the VAD detection obtained based on the energy of the original signal is illustrated in FIG. 13D. The result of the VAD detection obtained by tracking the stationary signal sequence is illustrated in FIG. 13E. The embodiments described above in conjunction with FIG. 1 to FIG. 9 are implemented on the amplitude of the smoothed original signal in FIG. 13C, and the detection result is relatively accurate. However, if for the energy of the original signal, the embodiments described above in conjunction with FIG. 10 to FIG. 12 are first implemented, that is, the energy of the original signal is first tracked, and then the embodiments described in conjunction with FIG. 1 to FIG. 9 are implemented, the accuracy of detection of the valid voice signal can be further improved. As illustrated in FIG. 13E, compared with FIG. 13D, a probability of false detection that transient noise is determined as a valid voice signal in the detection result in FIG. 13E is relatively low, such that the accuracy of the detection of the valid voice signal can be greatly improved.

Figure 14:
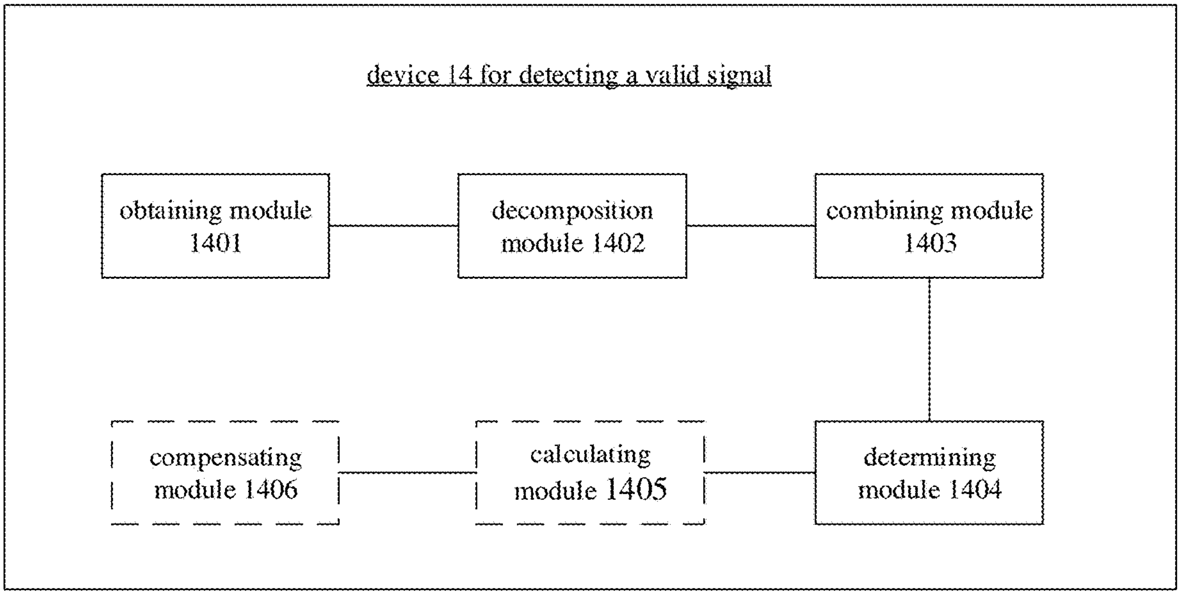
FIG. 14 is a structural block diagram illustrating a device for detecting a valid voice signal provided in embodiments of the disclosure.

The following describes the device for detecting a valid signal provided in the embodiments of the disclosure. Referring to FIG. 14, FIG. 14 is a structural block diagram illustrating a device for detecting a valid voice signal provided in embodiments of the disclosure. As illustrated in FIG. 14, a device 14 for detecting a valid voice signal includes an obtaining module 1401, a decomposition module 1402, a combining module 1403, and a determining module 1404.

The obtaining module 1401 is configured to obtain a first audio signal of a preset duration, where the first audio signal includes at least one audio frame signal.

The decomposition module 1402 is configured to obtain multiple wavelet decomposition signals respectively corresponding to the at least one audio frame signal by performing wavelet decomposition on each audio frame signal, where each wavelet decomposition signal contains multiple sample points and an audio intensity value of each sample point.

The combining module 1403 is configured to obtain a wavelet signal sequence by combining the wavelet decomposition signals corresponding to the at least one audio frame signal according to a framing sequence of the at least one audio frame signal in the first audio signal.

The determining module 1404 is configured to obtain a maximum value and a minimum value among audio intensity values of all sample points in the wavelet signal sequence, and determine a first audio intensity threshold according to the maximum value and the minimum value among the audio intensity values of all the sample points in the wavelet signal sequence.

The determining module 1404 is further configured to obtain sample points each having an audio intensity value greater than the first audio intensity threshold in the wavelet signal sequence, and determine a signal of sample points in the first audio signal corresponding to the sample points each having an audio intensity value greater than the first audio intensity threshold in the wavelet signal sequence as the valid voice signal.

In some possible embodiments, the determining module 1404 is further configured to determine the first audio intensity threshold and a second audio intensity threshold according to the maximum value and the minimum value among the audio intensity values of all the sample points in the wavelet signal sequence, where the first audio intensity threshold is less than the second audio intensity threshold.

The obtaining module 1401 is further configured to obtain a first sample point in the wavelet signal sequence, where an audio intensity value of a sample point previous to the first sample point is less than the second audio intensity threshold, and an audio intensity value of the first sample point is greater than the second audio intensity threshold.

The obtaining module 1401 is further configured to obtain a second sample point in the wavelet signal sequence, where the second sample point is after the first sample point and is the first of sample points each having an audio intensity value less than the first audio intensity threshold in the wavelet signal sequence.

The determining module 1404 is further configured to determine a signal of the sample points in the first audio signal corresponding to sample points from the first sample point to a sample point previous to the second sample point in the wavelet signal sequence as a valid voice segment in the valid voice signal.

Optionally, at least a first preset number of consecutive sample points are included between the second sample point and the first sample point.

In some possible embodiments, the determining module 1404 is further configured to determine an average value of first reference audio intensity values of a second preset number of consecutive sample points including a target sample point in the wavelet signal sequence as an audio intensity value of the target sample point.

In some possible implementations, the device 14 for detecting a valid voice signal further includes a calculating module 1405. Before the determining module 1404 determines the average value of the first reference audio intensity values of the second preset number of consecutive sample points including the target sample point in the wavelet signal sequence as the audio intensity value of the target sample point, the calculating module 1405 is configured to obtain a second reference audio intensity value of the target sample point by multiplying an audio intensity value of a sample point previous to the target sample point in the wavelet signal sequence by a smoothing coefficient. The calculating module 1405 is further configured to obtain a third reference audio intensity value of the target sample point by multiplying an average value of audio intensity values of sample points that include the target sample point and all consecutive sample points previous to the target sample point in the wavelet signal sequence by a remaining smoothing coefficient. The calculating module 1405 is further configured to determine a sum of the second reference audio intensity value and the third reference audio intensity value as a fourth reference audio intensity value of the target sample point. The determining module 1404 is further configured to determine a minimum value among fourth reference audio intensity values of sample points including the target sample point and all sample points previous to the target sample point in the wavelet signal sequence as the first reference audio intensity value of the target sample point.

Optionally, the determining module 1404 is further configured to determine a value obtained by processing a reference maximum value of each of all the wavelet decomposition signals in the wavelet signal sequence as the maximum value among the audio intensity values of all the sample points in the wavelet signal sequence, and determine a value obtained by processing a reference minimum value of each of all the wavelet decomposition signals in the wavelet signal sequence as the minimum value among the audio intensity values of all the sample points in the wavelet signal sequence, where for each wavelet decomposition signal, the reference maximum value of the wavelet decomposition signal is obtained according to a maximum value among audio intensity values of all sample points of the wavelet decomposition signal, and the reference minimum value of the wavelet decomposition signal is obtained according to a minimum value among audio intensity values of all sample points of the wavelet decomposition signal.

In some possible embodiments, the device 14 for detecting a valid voice signal further includes a compensating module 1406. Before the obtaining module 1401 obtains the first audio signal of the preset duration, the compensating module 1406 is further configured to obtain the first audio signal by compensating for a high-frequency component in an original audio signal of the preset duration.

In some possible implementations, the decomposition module 1402 is further configured to perform wavelet packet decomposition on each audio frame signal, and determine each signal obtained after the wavelet packet decomposition as the wavelet decomposition signal.

In some possible implementations, the determining module 1404 is further configured to determine a first audio intensity threshold according to $T_L=\min(\lambda_1\cdot(Sc_{max}-Sc_{min})+Sc_{min}, \lambda_2\cdot Sc_{min})$ and the maximum value and the minimum value among the audio intensity values of all the sample points in the wavelet signal sequence. $Sc_{max}$ represents the maximum value among the audio intensity values of all the sample points in the wavelet signal sequence, $Sc_{min}$ represents the minimum value among the audio intensity values of all the sample points in the wavelet signal sequence, $\lambda_1$ represents a second preset threshold, and $\lambda_2$ represents a third preset threshold.

In other possible implementations, the determining module 1404 is further configured to determine a first audio intensity threshold according to $T_L=\min(\lambda_1\cdot(Sc_{max}-Sc_{min})+Sc_{min}, \lambda_2\cdot Sc_{min})$ and the maximum value and the minimum value among the audio intensity values of all the sample points in the wavelet signal sequence, wherein $Sc_{max}$ represents the maximum value among the audio intensity values of all the sample points in the wavelet signal sequence, $Sc_{min}$ represents the minimum value among the audio intensity values of all the sample points in the wavelet signal sequence, $\lambda_1$ represents a second preset threshold, and $\lambda_2$ represents a third preset threshold; and determine the second audio intensity threshold according to $T_U=\alpha T_L$, where $\alpha$ represents a fourth preset threshold and is greater than 1.

It can be understood that, in embodiments, for the specific implementation of detection of the valid voice signal, reference may be made to embodiments described above in conjunction with FIG. 1 to FIG. 13E, which are not repeated herein.

According to embodiments, by collecting the energy information of all the sample points in the wavelet signal sequence, according to the energy distribution of all the sample points in the wavelet signal sequence, determination and detection of the valid voice signal may be achieved, such that the accuracy of detection of the valid voice can be improved.

Figure 15:
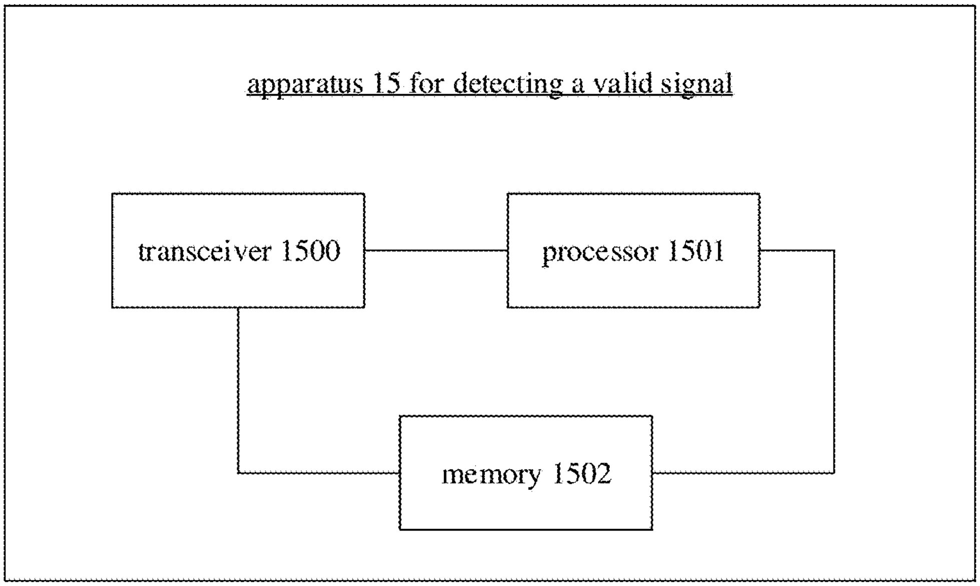
FIG. 15 is a structural block diagram illustrating an apparatus for detecting a valid voice signal provided in embodiments of the disclosure.

The following describes an apparatus for detecting a valid signal provided in the embodiments of the disclosure. Referring to FIG. 15, FIG. 15 is a structural block diagram illustrating an apparatus for detecting a valid voice signal provided in embodiments of the disclosure. As illustrated in FIG. 15, the apparatus 15 for detecting a valid voice signal includes a receiver 1500, a processor 1501, and a memory 1502.

The transceiver 1500 is coupled with the processor 1501 and the memory 1502, and the processor 1501 is further coupled with the memory 1502.

The transceiver 1500 is configured to obtain a first audio signal of a preset duration, where the first audio signal includes at least one audio frame signal.

The processor 1501 is configured to obtain multiple wavelet decomposition signals respectively corresponding to the at least one audio frame signal by performing wavelet decomposition on each audio frame signal, where each wavelet decomposition signal contains multiple sample points and an audio intensity value of each sample point.

The processor 1501 is further configured to obtain a wavelet signal sequence by combining the wavelet decomposition signals corresponding to the at least one audio frame signal according to a framing sequence of the at least one audio frame signal in the first audio signal.

The processor 1501 is further configured to obtain a maximum value and a minimum value among audio intensity values of all sample points in the wavelet signal sequence, and determine a first audio intensity threshold according to the maximum value and the minimum value among the audio intensity values of all the sample points in the wavelet signal sequence.

The processor 1501 is further configured to obtain sample points each having an audio intensity value greater than the first audio intensity threshold in the wavelet signal sequence, and determine a signal of sample points in the first audio signal corresponding to the sample points each having an audio intensity value greater than the first audio intensity threshold in the wavelet signal sequence as the valid voice signal.

The memory 1502 is configured to store computer programs, and the computer programs are invoked by the processor 1501.

In some possible embodiments, the processor 1501 is further configured to: determine the first audio intensity threshold and a second audio intensity threshold according to the maximum value and the minimum value among the audio intensity values of all the sample points in the wavelet signal sequence, where the first audio intensity threshold is less than the second audio intensity threshold; obtain a first sample point in the wavelet signal sequence, where an audio intensity value of a sample point previous to the first sample point is less than the second audio intensity threshold, and an audio intensity value of the first sample point is greater than the second audio intensity threshold; obtain a second sample point in the wavelet signal sequence, where the second sample point is after the first sample point and is the first of sample points each having an audio intensity value less than the first audio intensity threshold in the wavelet signal sequence; and determine a signal of the sample points in the first audio signal corresponding to sample points from the first sample point to a sample point previous to the second sample point in the wavelet signal sequence as a valid voice segment in the valid voice signal.

Optionally, a first preset number of consecutive sample points are included between the second sample point and the first sample point.

In some possible embodiments, the processor 1501 is further configured to determine an average value of first reference audio intensity values of a second preset number of consecutive sample points including a target sample point in the wavelet signal sequence as an audio intensity value of the target sample point.

In some possible embodiments, the processor 1501 is further configured to: obtain a second reference audio intensity value of the target sample point by multiplying an audio intensity value of a sample point previous to the target sample point in the wavelet signal sequence by a smoothing coefficient; obtain a third reference audio intensity value of the target sample point by multiplying an average value of audio intensity values of sample points that include the target sample point and all consecutive sample points previous to the target sample point in the wavelet signal sequence by a remaining smoothing coefficient; determine a sum of the second reference audio intensity value and the third reference audio intensity value as a fourth reference audio intensity value of the target sample point; and determine a minimum value among fourth reference audio intensity values of sample points including the target sample point and all sample points previous to the target sample point in the wavelet signal sequence as the first reference audio intensity value of the target sample point.

In some possible implementations, the processor 1501 is further configured to determine a value obtained by processing a reference maximum value of each of all the wavelet decomposition signals in the wavelet signal sequence as the maximum value among the audio intensity values of all the sample points in the wavelet signal sequence, and determine a value obtained by processing a reference minimum value of each of all the wavelet decomposition signals in the wavelet signal sequence as the minimum value among the audio intensity values of all the sample points in the wavelet signal sequence, where for each wavelet decomposition signal, the reference maximum value of the wavelet decomposition signal is obtained according to a maximum value among audio intensity values of all sample points of the wavelet decomposition signal, and the reference minimum value of the wavelet decomposition signal is obtained according to a minimum value among audio intensity values of all sample points of the wavelet decomposition signal.

Optionally, the processor 1501 is further configured to: obtain the first audio signal by compensating for a high-frequency component in an original audio signal of the preset duration.

In some possible embodiments, the processor 1501 is further configured to: perform wavelet packet decomposition on each audio frame signal, and determine each signal obtained after the wavelet packet decomposition as the wavelet decomposition signal.

In some possible implementations, the processor 1501 is further configured to: determine a first audio intensity threshold according to $T_L=\min(\lambda_1\cdot(Sc_{max}-Sc_{min})+Sc_{min}, \lambda_2\cdot Sc_{min})$ and the maximum value and the minimum value among the audio intensity values of all the sample points in the wavelet signal sequence. $Sc_{max}$ represents the maximum value among the audio intensity values of all the sample points in the wavelet signal sequence, $Sc_{min}$ represents the minimum value among the audio intensity values of all the sample points in the wavelet signal sequence, $\lambda_1$ represents a second preset threshold, and $\lambda_2$ represents a third preset threshold.

In some possible implementations, the processor 1501 is further configured to: determine a first audio intensity threshold according to $T_L=(Sc_{max}-Sc_{min})+Sc_{min}, \lambda_2\cdot Sc_{min})$ and the maximum value and the minimum value among the audio intensity values of all the sample points in the wavelet signal sequence, where $Sc_{max}$ represents the maximum value among the audio intensity values of all the sample points in the wavelet signal sequence, $Sc_{min}$ represents the minimum value among the audio intensity values of all the sample points in the wavelet signal sequence, $\lambda_1$ represents a second preset threshold, and $\lambda_2$ represents a third preset threshold; and determine the second audio intensity threshold according to $T_U=\alpha T_L$, where $\alpha$ represents a fourth preset threshold and is greater than 1.

It can be understood that the apparatus 15 for detecting a valid signal can perform implementations provided in the operations in the above-mentioned FIG. 1 to FIG. 13E through various built-in function modules of the apparatus 15. For the specific implementations, reference may be made to implementations provided in the operations in the above-mentioned FIG. 1 to FIG. 13E, which are not repeated herein.

According to embodiments, when the apparatus for detecting a valid voice signal detects a valid voice signal, other working modules of the apparatus can be woken up, thereby reducing power consumption of the apparatus.

A readable storage medium is further provided in the disclosure. The readable storage medium stores instructions, and the instructions are executed by a processor of the apparatus for detecting a valid voice signal to implement operations of the method in the various aspects of FIGS. 1 to 13E described above.

It should be noted that the above-mentioned terms “first” and “second” are merely for illustration, and should not be construed as indicating or implying relative importance.

In embodiments of the disclosure, the energy information of all the sample points in the wavelet signal sequence can be collected, and determination and detection of the valid voice signal may be achieved according to the energy distribution of the wavelet signal sequence, which can improve the accuracy of detection of the valid voice. In addition, the audio intensity values of all the sample points in the wavelet signal sequence are smoothed and the energy distribution information of all the sample points in the wavelet signal sequence may be tracked, such that the accuracy of the detection of the valid voice signal can be further improved.

In several embodiments provided in the disclosure, it can be understood that the method, device/apparatus, and system disclosed in embodiments provided herein may be implemented in other manners. For example, the embodiments described above are merely illustrative; for instance, the division of the unit is only a logical function division and there can be other manners of division during actual implementations, for example, multiple units or components may be combined or may be integrated into another system, or some features may be ignored or not performed. In addition, coupling, or direct coupling, or communication connection between each illustrated or discussed components may be indirect coupling or communication connection among devices or units via some interfaces, devices, and units, and may be electrical connection, mechanical connection, or other forms of connection.

The units described as separate components may or may not be physically separated, the components illustrated as units may or may not be physical units, that is, they may be in the same place or may be distributed to multiple network units. All or part of the units may be selected according to actual needs to achieve the purpose of the technical solutions of the embodiments.

In addition, the functional units in various embodiments of the disclosure may be integrated into one processing unit, or each unit may be physically present, or two or more units may be integrated into one unit. The above-mentioned integrated unit can be implemented in the form of hardware or can be implemented in the form of hardware in combination with a software function unit.

It will be understood by those of ordinary skill in the art that all or a part of the various methods of the embodiments described above may be accomplished by means of a program to instruct associated hardware, the program may be stored in a computer-readable storage medium. The program, when executed, can implement operations including the method embodiments. The storage medium may include: a removable storage device, read-only memory (ROM), random access memory (RAM), a magnetic disk, an optical disk, or other media that can store program codes.

Alternatively, the integrated unit may be stored in a computer-readable storage medium when it is implemented in the form of a software functional module and is sold or used as a separate product. Based on such understanding, the technical solutions of the disclosure essentially, or the part of the technical solutions that contributes to the related art may be embodied in the form of a software product. The computer software product is stored in a storage medium and includes instructions for causing a computer device (which may be a personal computer, a server, or a network device, etc.) to perform all or part of the method described in the various embodiments of the disclosure. The storage medium includes various medium capable of storing program codes, such as a removable storage device, a ROM, a RAM, a magnetic disk, an optical disk, or the like.

The above are merely specific embodiments of the disclosure, but the protection scope of the disclosure is not limited to this. Various changes or substitutions made by any person skilled in the art within the technical scope disclosed in the disclosure should be covered within the protection scope of the disclosure. Therefore, the protection scope of the disclosure should be subject to the protection scope of the claims.

What is claimed is:

1. A method for detecting a valid voice signal, the method being executed by a processor of an apparatus for detecting a valid signal and comprising:

obtaining, by the processor, a first audio signal of a preset duration, wherein the first audio signal comprises at least one audio frame signal;

obtaining a plurality of wavelet decomposition signals respectively corresponding to the at least one audio frame signal by performing, by the processor, wavelet decomposition on each audio frame signal, wherein each wavelet decomposition signal contains a plurality of sample points and an audio intensity value of each sample point;

obtaining a wavelet signal sequence by combining, by the processor, the wavelet decomposition signals corresponding to the at least one audio frame signal according to a framing sequence of the at least one audio frame signal in the first audio signal;

obtaining, by the processor, a maximum value and a minimum value among audio intensity values of all sample points in the wavelet signal sequence, and determining, by the processor, a first audio intensity threshold according to the maximum value and the minimum value among the audio intensity values of all the sample points in the wavelet signal sequence; and obtaining, by the processor, sample points each having an audio intensity value greater than the first audio intensity threshold in the wavelet signal sequence, and determining, by the processor, a signal of sample points in the first audio signal corresponding to the sample points each having an audio intensity value greater than the first audio intensity threshold in the wavelet signal sequence as the valid voice signal, wherein determining, by the processor, the first audio intensity threshold according to the maximum value and the minimum value among the audio intensity values of all the sample points in the wavelet signal sequence comprises:

determining, by the processor, the first audio intensity threshold and a second audio intensity threshold according to the maximum value and the minimum value among the audio intensity values of all the sample points in the wavelet signal sequence, wherein the first audio intensity threshold is less than the second audio intensity threshold, wherein determining, by the processor, the signal of the sample points in the first audio signal corresponding to the sample points each having the audio intensity value greater than the first audio intensity threshold in the wavelet signal sequence as the valid voice signal comprises:

obtaining, by the processor, a first sample point in the wavelet signal sequence, wherein an audio intensity value of a sample point previous to the first sample point is less than the second audio intensity threshold, and an audio intensity value of the first sample point is greater than the second audio intensity threshold;

obtaining, by the processor, a second sample point in the wavelet signal sequence, wherein the second sample point is after the first sample point and is the first of the sample points each having an audio intensity value less than the first audio intensity threshold in the wavelet signal sequence; and determining, by the processor, a signal of the sample points in the first audio signal corresponding to sample points from the first sample point to a sample point previous to the second sample point in the wavelet signal sequence as a valid voice segment in the valid voice signal.

2. The method of claim 1, wherein at least a preset number of consecutive sample points are comprised between the second sample point and the first sample point.

3. The method of claim 1, further comprising:

determining, by the processor, an average value of first reference audio intensity values of a preset number of consecutive sample points comprising a target sample point in the wavelet signal sequence as an audio intensity value of the target sample point.

4. The method of claim 3, further comprising:

prior to determining the average value of the first reference audio intensity values of the preset number of consecutive sample points comprising the target sample point in the wavelet signal sequence as the audio intensity value of the target sample point, obtaining, by the processor, a second reference audio intensity value of the target sample point by multiplying an audio intensity value of a sample point previous to the target sample point in the wavelet signal sequence by a smoothing coefficient;

obtaining, by the processor, a third reference audio intensity value of the target sample point by multiplying an average value of audio intensity values of sample points that comprise the target sample point and all consecutive sample points previous to the target sample point in the wavelet signal sequence by a remaining smoothing coefficient;

determining, by the processor, a sum of the second reference audio intensity value and the third reference audio intensity value as a fourth reference audio intensity value of the target sample point; and determining, by the processor, a minimum value among fourth reference audio intensity values of sample points comprising the target sample point and all sample points previous to the target sample point in the wavelet signal sequence as the first reference audio intensity value of the target sample point.

5. The method of claim 1, wherein obtaining the maximum value and the minimum value among the audio intensity values of all the sample points in the wavelet signal sequence comprises:

determining, by the processor, a value obtained by processing a reference maximum value of each of all the wavelet decomposition signals in the wavelet signal sequence as the maximum value among the audio intensity values of all the sample points in the wavelet signal sequence; and determining, by the processor, a value obtained by processing a reference minimum value of each of all the wavelet decomposition signals in the wavelet signal sequence as the minimum value among the audio intensity values of all the sample points in the wavelet signal sequence, wherein for each wavelet decomposition signal, the reference maximum value of the wavelet decomposition signal is obtained according to a maximum value among audio intensity values of all sample points of the wavelet decomposition signal, and the reference minimum value of the wavelet decomposition signal is obtained according to a minimum value among audio intensity values of all sample points of the wavelet decomposition signal.

6. The method of claim 1, further comprising:

prior to obtaining the first audio signal of the preset duration, obtaining, by the processor, the first audio signal by compensating for a high-frequency component in an original audio signal of the preset duration.

7. The method of claim 1, wherein performing the wavelet decomposition on each audio frame signal comprises:

performing, by the processor, wavelet packet decomposition on each audio frame signal, and determining each signal obtained after the wavelet packet decomposition as the wavelet decomposition signal.

8. The method of claim 1, wherein determining the first audio intensity threshold according to the maximum value and the minimum value among the audio intensity values of all the sample points in the wavelet signal sequence comprises:

determining, by the processor, the first audio intensity threshold according to $T_L=\min(\lambda_1\cdot(Sc_{max}-Sc_{min})+Sc_{min}, \lambda_2\cdot Sc_{min})$ and the maximum value and the minimum value among the audio intensity values of all the sample points in the wavelet signal sequence, wherein $Sc_{max}$ represents the maximum value among the audio intensity values of all the sample points in the wavelet signal sequence, $Sc_{min}$ represents the minimum value among the audio intensity values of all the sample points in the wavelet signal sequence, $\lambda_1$ represents a second preset threshold, and $\lambda_2$ represents a third preset threshold.

9. The method of claim 1, wherein determining the first audio intensity threshold and the second audio intensity threshold according to the maximum value and the minimum value among the audio intensity values of all the sample points in the wavelet signal sequence comprises:

determining, by the processor, the first audio intensity threshold according to $T_L=\min(\lambda_1\cdot(Sc_{max}-Sc_{min})+Sc_{min}, \lambda_2\cdot Sc_{min})$ and the maximum value and the minimum value among the audio intensity values of all the sample points in the wavelet signal sequence, wherein $Sc_{max}$ represents the maximum value among the audio intensity values of all the sample points in the wavelet signal sequence, $Sc_{min}$ represents the minimum value among the audio intensity values of all the sample points in the wavelet signal sequence, $\lambda$represents a second preset threshold, and $\lambda_2$ represents a third preset threshold; and determining, by the processor, the second audio intensity threshold according to $T_U=\alpha T_L$, wherein $\alpha$ represents a fourth preset threshold and is greater than 1.

10. An apparatus for detecting a valid voice signal, comprising:

a processor; and a memory coupled with the processor and storing computer programs which, when executed by the processor, are operable with the processor to:

obtain a first audio signal of a preset duration, wherein the first audio signal comprises at least one audio frame signal;

obtain a plurality of wavelet decomposition signals respectively corresponding to the at least one audio frame signal by performing wavelet decomposition on each audio frame signal, wherein each wavelet decomposition signal contains a plurality of sample points and an audio intensity value of each sample point;

obtain a wavelet signal sequence by combining the wavelet decomposition signals corresponding to the at least one audio frame signal according to a framing sequence of the at least one audio frame signal in the first audio signal;

obtain a maximum value and a minimum value among audio intensity values of all sample points in the wavelet signal sequence, and determine a first audio intensity threshold according to the maximum value and the minimum value among the audio intensity values of all the sample points in the wavelet signal sequence; and obtain sample points each having an audio intensity value greater than the first audio intensity threshold in the wavelet signal sequence, and determine a signal of sample points in the first audio signal corresponding to the sample points each having an audio intensity value greater than the first audio intensity threshold in the wavelet signal sequence as the valid voice signal, wherein the processor configured to determine the first audio intensity threshold according to the maximum value and the minimum value among the audio intensity values of all the sample points in the wavelet signal sequence is configured to:

determine the first audio intensity threshold and a second audio intensity threshold according to the maximum value and the minimum value among the audio intensity values of all the sample points in the wavelet signal sequence, wherein the first audio intensity threshold is less than the second audio intensity threshold, wherein the processor configured to determine the signal of the sample points in the first audio signal corresponding to the sample points each having the audio intensity value greater than the first audio intensity threshold in the wavelet signal sequence as the valid voice signal is configured to:

obtain a first sample point in the wavelet signal sequence, wherein an audio intensity value of a sample point previous to the first sample point is less than the second audio intensity threshold, and an audio intensity value of the first sample point is greater than the second audio intensity threshold;

obtain a second sample point in the wavelet signal sequence, wherein the second sample point is after the first sample point and is the first of sample points each having an audio intensity value less than the first audio intensity threshold in the wavelet signal sequence; and determine a signal of the sample points in the first audio signal corresponding to sample points from the first sample point to a sample point previous to the second sample point in the wavelet signal sequence as a valid voice segment in the valid voice signal.

11. The apparatus of claim 10, wherein at least a preset number of consecutive sample points are comprised between the second sample point and the first sample point.

12. The apparatus of claim 10, wherein the processor is further configured to:

determine an average value of first reference audio intensity values of a preset number of consecutive sample points comprising a target sample point in the wavelet signal sequence as an audio intensity value of the target sample point.

13. The apparatus of claim 12, wherein the processor is further configured to:

prior to determining the average value of the first reference audio intensity values of the preset number of consecutive sample points comprising the target sample point in the wavelet signal sequence as the audio intensity value of the target sample point, obtain a second reference audio intensity value of the target sample point by multiplying an audio intensity value of a sample point previous to the target sample point in the wavelet signal sequence by a smoothing coefficient;

obtain a third reference audio intensity value of the target sample point by multiplying an average value of audio intensity values of sample points that comprise the target sample point and all consecutive sample points previous to the target sample point in the wavelet signal sequence by a remaining smoothing coefficient;

determine a sum of the second reference audio intensity value and the third reference audio intensity value as a fourth reference audio intensity value of the target sample point; and determine a minimum value among fourth reference audio intensity values of sample points comprising the target sample point and all sample points previous to the target sample point in the wavelet signal sequence as the first reference audio intensity value of the target sample point.

14. The apparatus of claim 10, wherein the processor configured to obtain the maximum value and the minimum value among the audio intensity values of all the sample points in the wavelet signal sequence is configured to:

determine a value obtained by processing a reference maximum value of each of all the wavelet decomposition signals in the wavelet signal sequence as the maximum value among the audio intensity values of all the sample points in the wavelet signal sequence; and determine a value obtained by processing a reference minimum value of each of all the wavelet decomposition signals in the wavelet signal sequence as the minimum value among the audio intensity values of all the sample points in the wavelet signal sequence, wherein for each wavelet decomposition signal, the reference maximum value of the wavelet decomposition signal is obtained according to a maximum value among audio intensity values of all sample points of the wavelet decomposition signal, and the reference minimum value of the wavelet decomposition signal is obtained according to a minimum value among audio intensity values of all sample points of the wavelet decomposition signal.

15. The apparatus of claim 10, wherein the processor is further configured to:

prior to obtaining the first audio signal of the preset duration, obtain the first audio signal by compensating for a high-frequency component in an original audio signal of the preset duration.

16. The apparatus of claim 10, wherein the processor configured to perform the wavelet decomposition on each audio frame signal is configured to:

perform wavelet packet decomposition on each audio frame signal, and determining each signal obtained after the wavelet packet decomposition as the wavelet decomposition signal.

17. The apparatus of claim 10, wherein the processor configured to determine the first audio intensity threshold according to the maximum value and the minimum value among the audio intensity values of all the sample points in the wavelet signal sequence is configured to:

determine the first audio intensity threshold according to $T_L=\min(\lambda_1\cdot(Sc_{max}-Sc_{min})+Sc_{min},\ \lambda_2\cdot Sc_{min})$ and the maximum value and the minimum value among the audio intensity values of all the sample points in the wavelet signal sequence, wherein $Sc_{max}$ represents the maximum value among the audio intensity values of all the sample points in the wavelet signal sequence, $Sc_{min}$ represents the minimum value among the audio intensity values of all the sample points in the wavelet signal sequence, $\lambda_1$ represents a second preset threshold, and $\lambda_2$ represents a third preset threshold.

18. A non-transitory computer readable storage medium storing instructions which, when executed by a processor of an apparatus for detecting a valid voice signal, are operable with the apparatus to:

obtain a first audio signal of a preset duration, wherein the first audio signal comprises at least one audio frame signal;

obtain a plurality of wavelet decomposition signals respectively corresponding to the at least one audio frame signal by performing wavelet decomposition on each audio frame signal, wherein each wavelet decomposition signal contains a plurality of sample points and an audio intensity value of each sample point;

obtain a wavelet signal sequence by combining the wavelet decomposition signals corresponding to the at least one audio frame signal according to a framing sequence of the at least one audio frame signal in the first audio signal;

obtain a maximum value and a minimum value among audio intensity values of all sample points in the wavelet signal sequence, and determine a first audio intensity threshold according to the maximum value and the minimum value among the audio intensity values of all the sample points in the wavelet signal sequence; and obtain sample points each having an audio intensity value greater than the first audio intensity threshold in the wavelet signal sequence, and determine a signal of sample points in the first audio signal corresponding to the sample points each having an audio intensity value greater than the first audio intensity threshold in the wavelet signal sequence as the valid voice signal, wherein the instructions operable with the apparatus to determine the first audio intensity threshold according to the maximum value and the minimum value among the audio intensity values of all the sample points in the wavelet signal sequence are operable with the apparatus to:

determine the first audio intensity threshold and a second audio intensity threshold according to the maximum value and the minimum value among the audio intensity values of all the sample points in the wavelet signal sequence, wherein the first audio intensity threshold is less than the second audio intensity threshold, wherein the instructions operable with the apparatus to determine the signal of the sample points in the first audio signal corresponding to the sample points each having the audio intensity value greater than the first audio intensity threshold in the wavelet signal sequence as the valid voice signal are operable with the apparatus to:

obtain a first sample point in the wavelet signal sequence, wherein an audio intensity value of a sample point previous to the first sample point is less than the second audio intensity threshold, and an audio intensity value of the first sample point is greater than the second audio intensity threshold;

obtain a second sample point in the wavelet signal sequence, wherein the second sample point is after the first sample point and is the first of sample points each having an audio intensity value less than the first audio intensity threshold in the wavelet signal sequence; and determine a signal of the sample points in the first audio signal corresponding to sample points from the first sample point to a sample point previous to the second sample point in the wavelet signal sequence as a valid voice segment in the valid voice signal.

* * * * *